United States Patent
Kami et al.

(10) Patent No.: US 10,845,738 B2
(45) Date of Patent: Nov. 24, 2020

(54) IMAGE FORMING METHOD, IMAGE FORMING APPARATUS, AND PROCESS CARTRIDGE

(71) Applicants: Hidetoshi Kami, Shizuoka (JP); Akihiro Sugino, Shizuoka (JP); Keisuke Shimoyama, Shizuoka (JP); Ryohta Takahashi, Shizuoka (JP)

(72) Inventors: Hidetoshi Kami, Shizuoka (JP); Akihiro Sugino, Shizuoka (JP); Keisuke Shimoyama, Shizuoka (JP); Ryohta Takahashi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/510,648

(22) Filed: Jul. 12, 2019

(65) Prior Publication Data

US 2020/0004179 A1 Jan. 2, 2020

Related U.S. Application Data

(63) Continuation of application No. 15/703,805, filed on Sep. 13, 2017, now Pat. No. 10,416,594.

(30) Foreign Application Priority Data

Oct. 21, 2016 (JP) .................. 2016-206559

(51) Int. Cl.
*G03G 15/16* (2006.01)
*G03G 15/01* (2006.01)
(Continued)

(52) U.S. Cl.
CPC .......... *G03G 15/162* (2013.01); *G03B 21/28* (2013.01); *G03G 5/047* (2013.01); *G03G 5/0503* (2013.01);
(Continued)

(58) Field of Classification Search
CPC .......... G03G 5/04; G03G 5/043; G03G 5/047; G03G 5/0417; G03G 9/0821; G03G 9/0823
See application file for complete search history.

(56) References Cited

U.S. PATENT DOCUMENTS

| 4,772,525 A | 9/1988 | Badesha et al. |
| 5,871,876 A | 2/1999 | Ikuno et al. |
| (Continued) | | |

FOREIGN PATENT DOCUMENTS

| JP | 57-078402 | 5/1982 |
| JP | 63-285552 | 11/1988 |
| (Continued) | | |

OTHER PUBLICATIONS

U.S. Appl. No. 08/862,260 to Tetsuro Suzuki et al., filed May 23, 1997.
(Continued)

*Primary Examiner* — Carla J Therrien
(74) *Attorney, Agent, or Firm* — Oblon, McClelland, Maier & Neustadt, L.L.P.

(57) ABSTRACT

An image forming method includes forming an image with a toner using a photoconductor in which an intermediate layer and a photosensitive layer including a charge generating layer and a charge transport layer are formed overlying an electroconductive substrate, wherein the ionization potential of the surface of the photoconductor and the ionization potential of the surface of the toner satisfy the following relations 1 and 2,

|$Ip$ (the surface of the photoconductor)$-Ip$ (the surface of the toner)|≤5.53 (eV)     Relation 1

5.45 (eV)≤$Ip$ (the surface of the photoconductor) ≤5.53 (eV)     Relation 2

(Continued)

where Ip (the surface of the photoconductor) represents the ionization potential of the surface of the photoconductor and Ip (the surface of the toner) represents the ionization potential of the surface of the toner.

8 Claims, 4 Drawing Sheets

(51) Int. Cl.
  *G03B 21/28* (2006.01)
  *H04N 5/74* (2006.01)
  *G03G 5/047* (2006.01)
  *G03G 5/07* (2006.01)
  *G03G 5/05* (2006.01)
  *G03G 5/06* (2006.01)

(52) U.S. Cl.
  CPC ........... *G03G 5/056* (2013.01); *G03G 5/0546* (2013.01); *G03G 5/0592* (2013.01); *G03G 5/0596* (2013.01); *G03G 5/0664* (2013.01); *G03G 5/075* (2013.01); *G03G 15/0194* (2013.01); *G03G 15/161* (2013.01); *H04N 5/74* (2013.01); *G03G 2215/00962* (2013.01); *G03G 2215/1652* (2013.01); *G03G 2215/1661* (2013.01); *G03G 2221/183* (2013.01)

(56) References Cited

U.S. PATENT DOCUMENTS

| | | | |
|---|---|---|---|
| 6,030,733 A | 2/2000 | Kami et al. | |
| 6,151,468 A | 11/2000 | Kami et al. | |
| 6,326,112 B1 | 12/2001 | Tamura et al. | |
| 6,653,033 B1 | 11/2003 | Kami et al. | |
| 2002/0106570 A1 | 8/2002 | Kami et al. | |
| 2002/0115005 A1 | 8/2002 | Ikuno et al. | |
| 2002/0173578 A1 | 11/2002 | Suzuki et al. | |
| 2003/0016968 A1 | 1/2003 | Takahashi et al. | |
| 2003/0026625 A1 | 2/2003 | Tamiya et al. | |
| 2003/0035660 A1 | 2/2003 | Sugino et al. | |
| 2003/0035661 A1 | 2/2003 | Kabata et al. | |
| 2003/0053821 A1 | 3/2003 | Miyakawa | |
| 2003/0059693 A1 | 3/2003 | Ikegami et al. | |
| 2003/0073015 A1 | 4/2003 | Tamoto et al. | |
| 2003/0077531 A1 | 4/2003 | Suzuki et al. | |
| 2003/0095814 A1 | 5/2003 | Miyakawa | |
| 2003/0113642 A1 | 6/2003 | Kami et al. | |
| 2003/0118359 A1 | 6/2003 | Ogiyama et al. | |
| 2003/0129512 A1 | 7/2003 | Sugino et al. | |
| 2003/0194627 A1 | 10/2003 | Ikegami et al. | |
| 2003/0215726 A1 | 11/2003 | Sugino et al. | |
| 2003/0219279 A1 | 11/2003 | Nohsho et al. | |
| 2004/0028435 A1 | 2/2004 | Kurimoto et al. | |
| 2004/0048178 A1 | 3/2004 | Ikuno et al. | |
| 2004/0105692 A1 | 6/2004 | Tamiya et al. | |
| 2004/0126687 A1 | 7/2004 | Ikegami et al. | |
| 2004/0126689 A1 | 7/2004 | Tamoto et al. | |
| 2004/0185358 A1 | 9/2004 | Kami | |
| 2004/0197688 A1 | 10/2004 | Tamoto et al. | |
| 2004/0218948 A1 | 11/2004 | Miyakawa | |
| 2004/0234294 A1 | 11/2004 | Nagame et al. | |
| 2004/0265714 A1 | 12/2004 | Miyakawa | |
| 2005/0008957 A1 | 1/2005 | Ikegami et al. | |
| 2005/0026058 A1 | 2/2005 | Kami et al. | |
| 2005/0031377 A1 | 2/2005 | Kabata et al. | |
| 2005/0053853 A1 | 3/2005 | Sugino et al. | |
| 2005/0079433 A1 | 4/2005 | Watanabe et al. | |
| 2005/0105942 A1 | 5/2005 | Kurimoto et al. | |
| 2005/0106482 A1 | 5/2005 | Kami et al. | |
| 2005/0118518 A1 | 6/2005 | Ikegami et al. | |
| 2005/0130050 A1 | 6/2005 | Takada et al. | |
| 2005/0141919 A1 | 6/2005 | Kitajima et al. | |
| 2005/0158644 A1 | 7/2005 | Kondo et al. | |
| 2005/0170272 A1 | 8/2005 | Suzuki et al. | |
| 2005/0181291 A1 | 8/2005 | Kami et al. | |
| 2005/0201778 A1 | 9/2005 | Takada et al. | |
| 2005/0255395 A1 | 11/2005 | Suzuki et al. | |
| 2006/0056893 A1 | 3/2006 | Kurimoto et al. | |
| 2006/0062595 A1 | 3/2006 | Nousho et al. | |
| 2006/0127116 A1 | 6/2006 | Ogiyama et al. | |
| 2006/0141378 A1 | 6/2006 | Takada et al. | |
| 2006/0199092 A1 | 9/2006 | Sugino et al. | |
| 2006/0269323 A1 | 11/2006 | Kabata et al. | |
| 2006/0286473 A1 | 12/2006 | Kami | |
| 2007/0015074 A1 | 1/2007 | Sugino et al. | |
| 2007/0031746 A1 | 2/2007 | Toshine et al. | |
| 2007/0059039 A1 | 3/2007 | Shimoyama et al. | |
| 2007/0059618 A1 | 3/2007 | Kurimoto et al. | |
| 2007/0059619 A1 | 3/2007 | Shimoyama et al. | |
| 2007/0117033 A1 | 5/2007 | Sugino et al. | |
| 2007/0196749 A1 | 8/2007 | Inaba et al. | |
| 2007/0196750 A1 | 8/2007 | Fujiwara et al. | |
| 2007/0212626 A1 | 9/2007 | Toshine et al. | |
| 2007/0248901 A1 | 10/2007 | Shimoyama et al. | |
| 2007/0254224 A1 | 11/2007 | Sugino | |
| 2007/0264047 A1 | 11/2007 | Kurimoto et al. | |
| 2007/0287083 A1 | 12/2007 | Gondoh et al. | |
| 2008/0085459 A1 | 4/2008 | Kami et al. | |
| 2008/0112742 A1 | 5/2008 | Nakamori et al. | |
| 2008/0113285 A1 | 5/2008 | Nakamori et al. | |
| 2008/0113286 A1 | 5/2008 | Shimoyama et al. | |
| 2008/0138725 A1 | 6/2008 | Fujiwara et al. | |
| 2008/0153021 A1 | 6/2008 | Ikuno et al. | |
| 2008/0193865 A1 | 8/2008 | Kondo et al. | |
| 2008/0199217 A1 | 8/2008 | Iwamoto et al. | |
| 2008/0227008 A1 | 9/2008 | Kami et al. | |
| 2008/0280221 A1 | 11/2008 | Shimoyama et al. | |
| 2008/0305426 A1 | 12/2008 | Kurimoto et al. | |
| 2008/0311499 A1 | 12/2008 | Kami et al. | |
| 2008/0318142 A1 | 12/2008 | Kawasaki et al. | |
| 2009/0067891 A1 | 3/2009 | Kami et al. | |
| 2009/0068577 A1 | 3/2009 | Ohta et al. | |
| 2009/0136260 A1 | 5/2009 | Ikegami et al. | |
| 2009/0148180 A1 | 6/2009 | Fujiwara et al. | |
| 2009/0180804 A1 | 7/2009 | Kurimoto et al. | |
| 2009/0185821 A1 | 7/2009 | Iwamoto et al. | |
| 2009/0208246 A1 | 8/2009 | Kami | |
| 2009/0311616 A1 | 12/2009 | Shimoyama et al. | |
| 2010/0119260 A1 | 5/2010 | Egawa et al. | |
| 2010/0124712 A1 | 5/2010 | Egawa et al. | |
| 2010/0172670 A1 | 7/2010 | Oshima et al. | |
| 2010/0232831 A1 | 9/2010 | Fujiwara et al. | |
| 2010/0233602 A1 | 9/2010 | Yamamoto et al. | |
| 2010/0260513 A1 | 10/2010 | Kawasaki et al. | |
| 2010/0260515 A1 | 10/2010 | Shimoyama et al. | |
| 2010/0290807 A1 | 11/2010 | Shimoyama et al. | |
| 2010/0316423 A1 | 12/2010 | Kami et al. | |
| 2011/0020740 A1 | 1/2011 | Sugino et al. | |
| 2011/0033203 A1 | 2/2011 | Watanabe et al. | |
| 2011/0076057 A1 | 3/2011 | Kami et al. | |
| 2011/0086305 A1* | 4/2011 | Watanabe | G03G 9/0806 430/108.1 |
| 2011/0111335 A1 | 5/2011 | Shimoyama et al. | |
| 2011/0170884 A1 | 7/2011 | Yamane et al. | |
| 2011/0183255 A1 | 7/2011 | Kurimoto et al. | |
| 2011/0200924 A1 | 8/2011 | Kami et al. | |
| 2011/0286777 A1 | 11/2011 | Sugino et al. | |
| 2012/0008984 A1 | 1/2012 | Kami et al. | |
| 2012/0163860 A1 | 6/2012 | Shimoyama et al. | |
| 2012/0183313 A1 | 7/2012 | Kurimoto et al. | |
| 2012/0237228 A1 | 9/2012 | Kami | |
| 2013/0022902 A1 | 1/2013 | Shimoyama et al. | |
| 2013/0059242 A1 | 3/2013 | Asano et al. | |
| 2013/0059243 A1 | 3/2013 | Hirose et al. | |
| 2013/0243483 A1 | 9/2013 | Hirose et al. | |
| 2013/0251401 A1 | 9/2013 | Asano et al. | |
| 2013/0252166 A1 | 9/2013 | Yanagida | |
| 2013/0330104 A1 | 12/2013 | Shimoyama et al. | |
| 2014/0193185 A1 | 7/2014 | Kami et al. | |
| 2014/0234763 A1 | 8/2014 | Sugino et al. | |
| 2015/0132690 A1* | 5/2015 | Asahina | G03G 9/08795 430/105 |

(56) References Cited

U.S. PATENT DOCUMENTS

| | | |
|---|---|---|
| 2015/0227063 A1 | 8/2015 | Kami et al. |
| 2015/0346613 A1 | 12/2015 | Kami et al. |
| 2016/0274475 A1 | 9/2016 | Eguchi et al. |

FOREIGN PATENT DOCUMENTS

| | | | |
|---|---|---|---|
| JP | 5-173460 | 7/1993 | |
| JP | 5-289458 | 11/1993 | |
| JP | 7-191590 | 7/1995 | |
| JP | 7-234618 | 9/1995 | |
| JP | 7-292095 | 11/1995 | |
| JP | 2001-255685 A | 9/2001 | |
| JP | 2001-330973 | 11/2001 | |
| JP | 2001-350329 | 12/2001 | |
| JP | 2003-186222 | 7/2003 | |
| JP | 2003-202696 A | 7/2003 | |
| JP | 2005-165229 | 6/2005 | |
| JP | 2006-259155 | 9/2006 | |
| JP | 2006-276263 A | 10/2006 | |
| JP | 2006-323310 A | 11/2006 | |
| JP | 2007-171662 | 7/2007 | |
| JP | 2007-226189 A | 9/2007 | |
| JP | 2009-186984 | 8/2009 | |
| JP | 2012-073281 | 4/2012 | |
| JP | 2012-150403 A | 8/2012 | |
| JP | 2013088714 A * | 5/2013 | ........... G03G 5/0596 |
| JP | 2013-231866 | 11/2013 | |

OTHER PUBLICATIONS

RKI Instruments, "Photoelectron Spectroscopy," Oct. 24, 2006.
Riken Keiki, "Photoelectron Spectrometer Surface Analyzer Model AC-2," Mar. 4, 2016.

* cited by examiner

IMAGE FORMING METHOD, IMAGE FORMING APPARATUS, AND PROCESS CARTRIDGE

CROSS-REFERENCE TO RELATED APPLICATIONS

This patent application is a continuation of U.S. patent application Ser. No. 15/703,805 filed Sep. 13, 2017, which is based on and claims priority pursuant to 35 U.S.C. § 119 to Japanese Patent Application No. 2016-206559 filed on Oct. 21, 2016 in the Japan Patent Office, the entire contents of each of which is hereby incorporated by reference herein.

BACKGROUND

Technical Field

The present disclosure relates to an image forming method, an image forming apparatus, and a process cartridge.

Description of the Related Art

Electrophotography is used not only in offices but also in production printing field where outputs are used as products. Electrophotography obviates the need for plate making unlike offset printing and has an advantage that a required number of printed matter can be produced on demand. On the other hand, the output by electrophotography need improvement on higher quality and uniformity.

One of the issues about the quality of output is negative residual images. The negative residual image is an image deficiency identified as a residual image in a half tone image. For example, when black texts are output in a white background and sequentially a halftone image is output on the entire thereof, history of the black text portion thinly appears on the half tone image in comparison with the vicinity at photoconductor cycle.

SUMMARY

According to the present invention, provided is an improved image forming method including forming an image with a toner using a photoconductor in which an intermediate layer and a photosensitive layer including a charge generating layer and a charge transport layer are formed overlying an electroconductive substrate, wherein the ionization potential of the surface of the photoconductor and the ionization potential of the surface of the toner satisfy the following relations 1 and 2, $$|Ip \text{ (the surface of the photoconductor)} - Ip \text{ (the surface of the toner)}| \leq 5.53 \text{ (eV)} \quad \text{Relation 1}$$

$$5.45 \text{ (eV)} \leq Ip \text{ (the surface of the photoconductor)} \leq 5.53 \text{ (eV)} \quad \text{Relation 2}$$

where Ip (the surface of the photoconductor) represents the ionization potential of the surface of the photoconductor and Ip (the surface of the toner) represents the ionization potential of the surface of the toner.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
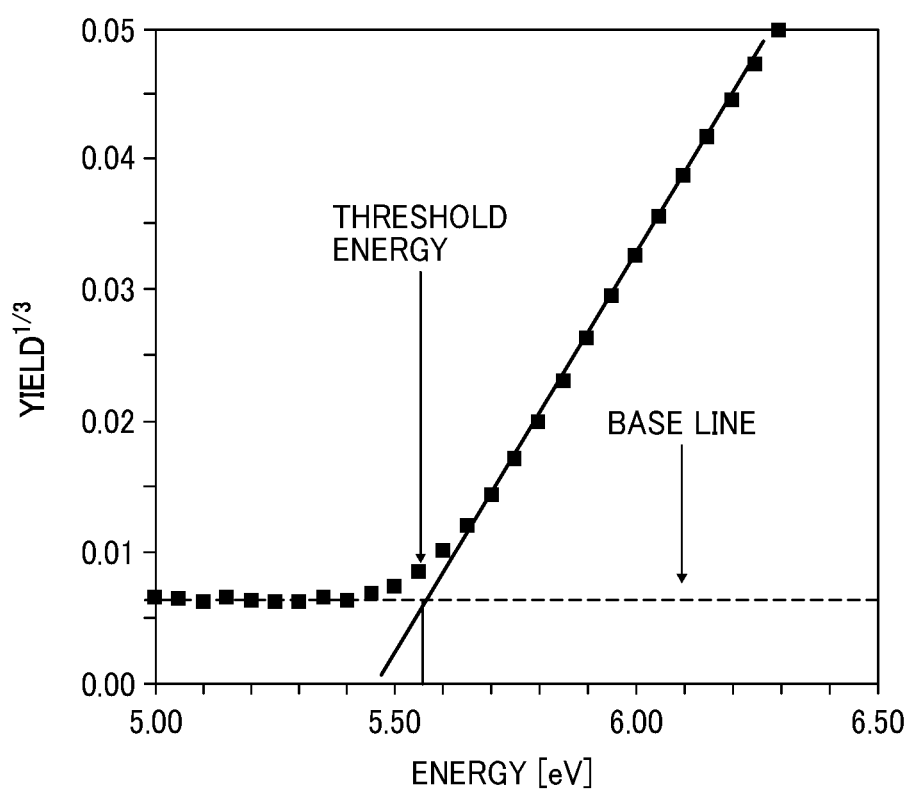
FIG. 1 is a diagram illustrating an example of the measuring result of electron yield spectrometry.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The appearing mechanism of the negative residual image is, for example, as follows. For example, history of irradiation and transfer causes the negative residual image to appear. For example, non-irradiated portions on which no toner image is present on a photoconductor during transfer are under stronger stress than irradiated portion on which a toner image is developed so that image history is caused with this bias remaining. Due to the transfer stress in which the charge is eccentrically present on the photosensitive layer, the surface voltage on the photoconductor is not uniform. This is thought to cause a residual image to appear on an output image.

A number of methods have been disclosed to cancel this residual image.

For example, a method is disclosed in which a residual image recognition device is provided to output an image for canceling a residual image when the residual image is detected as a result of forming a number of images many times.

Another method is disclosed in which, based on the layer (film) thickness of a photoconductor, the waiting time of image forming, the temperature of a photoconductor, the formulation of a photoconductor, and the manufacturing lot, the grid voltage, the developing voltage, the light amount of a quenching lamp, etc. are changed every time the photoconductor travels one round to stabilize the surface voltage, thereby keeping the image density constant.

Another method is disclosed in which a light irradiation device is disposed between the transfer device and the cleaner to irradiate the photoconductor with quenching light to discharge the surface of the photoconductor.

Another method is disclosed in which electrodes are provided between the transfer device and the charger upstream of the charger while the electrodes are caused adjacent to the surface of the photoconductor and a voltage having the same polarity as with the charging voltage of the surface of the photoconductor is applied to the surface of the photoconductor to remove a residual image.

Another method is disclosed in which the wavelength of light emitted from a quenching device is determined to be in a range of from the half value width of the maximum absorbance in the absorbance properties of the photosensitive layer or the charge generating material contained in the photosensitive layer.

Another method is disclosed in which, regarding quenching of a predetermined single layer photoconductor, a wave length λ0 of an exposure light source and a wave length λ1 of quenching light satisfy the relation: λ0-200 nm≤λ1≤780 nm.

BRIEF DESCRIPTION OF THE SEVERAL VIEWS OF THE DRAWINGS

Figure 2:
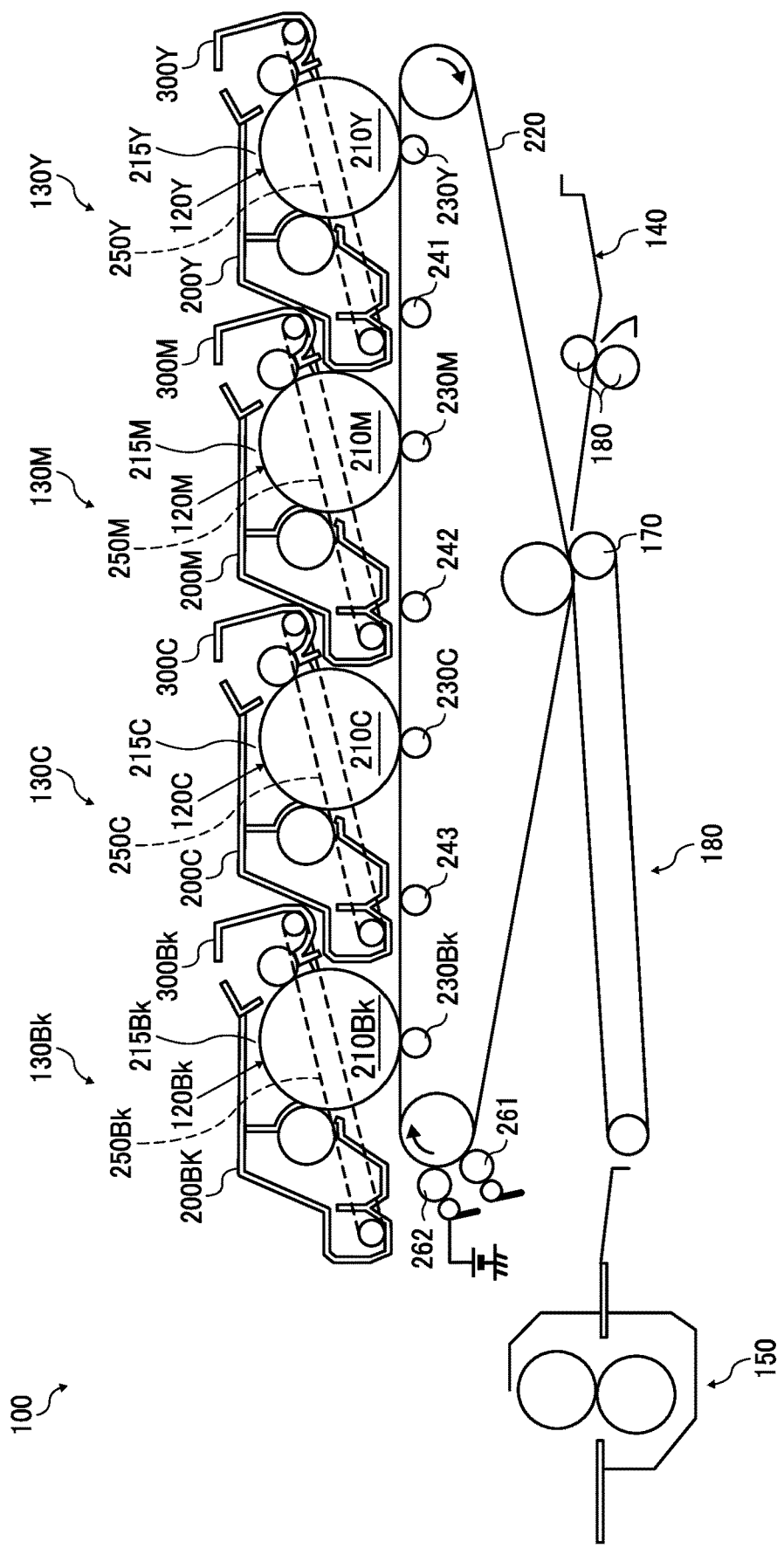
FIG. 2 is a schematic diagram illustrating an example of the image forming apparatus according to an embodiment of the present disclosure.
Figure 3:
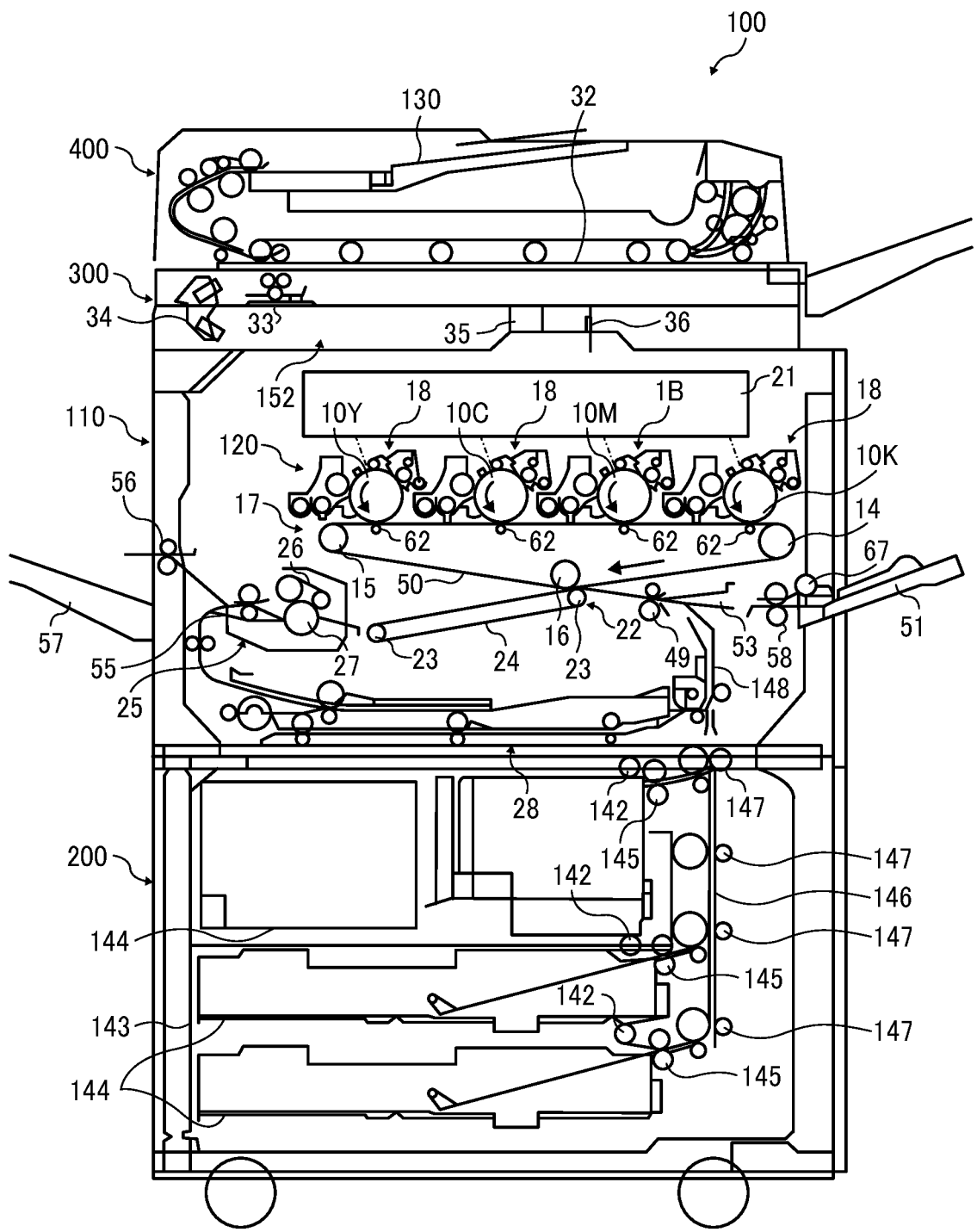
FIG. 3 is a schematic diagram illustrating another example of the image forming apparatus according to an embodiment of the present disclosure.
Figure 4:
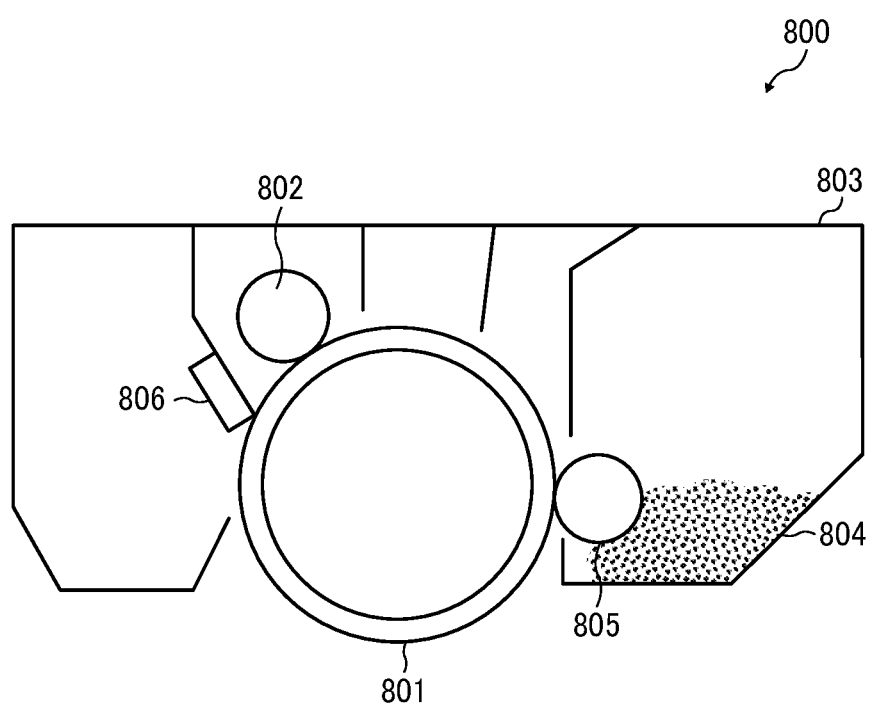
FIG. 4 is a schematic diagram illustrating an example of the process cartridge according to an embodiment of the present disclosure.

Various other objects, features and attendant advantages of the present invention will be more fully appreciated as the same becomes better understood from the detailed description when considered in connection with the accompanying drawings in which like reference characters designate like corresponding parts throughout and wherein:

FIG. 1 is a diagram illustrating an example of the measuring result of electron yield spectrometry;

FIG. 2 is a schematic diagram illustrating an example of the image forming apparatus according to an embodiment of the present disclosure;

FIG. 3 is a schematic diagram illustrating another example of the image forming apparatus according to an embodiment of the present disclosure; and FIG. 4 is a schematic diagram illustrating an example of the process cartridge according to an embodiment of the present disclosure.

DETAILED DESCRIPTION OF THE EMBODIMENTS

The embodiments of the present invention are described in detail below, but the present invention is not limited thereto.

With regard to the method in which a residual image recognition device is provided, image formation is obliged to stop in the case of continuation printing due to outputting of images (solid images) to cancel residual images. Accordingly, productivity deteriorates. If residual images frequently appear, the consumption amount of toner increases.

With regard to the method to keep the image density, the image forming condition is changed every time the photoconductor travels one round depending on the manufacturing condition of the photoconductor and the state of the waiting time, the condition of the photoconductor significantly varies, which may make it impossible to cancel residual images.

With regard to the method in which a light irradiation device is disposed, the photoconductor is irradiated with light between the transfer process and the cleaning process to remove residual charges. However, in the case of reverse developing using negatively-charged toner, what is trapped during the transfer process is mostly positive electric charges but what can be removed by light irradiation in the case of a negative charging photoconductor is negative electric charges. In this combination, residual images may not be canceled.

With regard to the method in which electrodes are provided, the electrode is provided in contact with the photoconductor. Uneven voltage caused by attachment of uncleaned toner to the electrode may occur.

Also, in both of the method in which the wavelength of light emitted from a quenching device is determined and the method in which the relation of wave length is defined, it is difficult to cancel the residual potential in the deep part of the photosensitive layer. In particular, in the case in which the thickness of the photosensitive layer is increased or the case in which the image forming speed is up, the charges caused by quenching light tend not to easily move due to the residual potential in the deep part of the photosensitive layer so that the charging voltage in the photosensitive layer is uneven.

As described above, negative residual images are not sufficiently canceled based on improvement of image forming process or there is a trade-off between canceling residual images and productivity. Therefore, it is desirable to impart resistance to negative residual image to the photoconductor itself.

The photoconductor in the present disclosure includes an electroconductive substrate, an intermediate layer thereon, and a photosensitive layer including a laminate structure of a charge generating layer and a charge transport layer.

If a function separated photoconductor is used, the interfaces of each layer has ideal conditions. As an example, the interface between the charge generating layer and the charge transport layer is designed in order that no barrier of energy levels is formed for carrier infusion from the charge generating layer to the charge transport layer. That is, it is preferable that the ionization potential of the charge transport layer be lower than that of the charge generating layer.

The present inventors have thought that if the contact interface between the photoconductor and toner is designed as such, history of the transfer process formed for the photoconductor can minimize the impact of the toner. If so, the negative residual image can be minimized. Based on this thought, the present inventors have noticed that quality of negative residual image differs depending on the kind of a photoconductor and the kind of toner. The present inventors have further found that this bias can be suppressed if the difference of the ionization potential between toner and the surface of a photoconductor is suppressed to 0.18 eV or less (Relation 1 |Ip (the surface of the photoconductor)−Ip (the surface of the toner)|≤0.18 (eV)).

When the surface of the photoconductor is modified, this balance is off. Accordingly, the ionization potential of the surface of the photoconductor is preferably high in some degree. Specifically, it is preferably from 5.45 to 5.53 eV (Relation 2: 5.45 (eV)≤Ip (the surface of the photoconductor)≤5.53 (eV)).

The ionization potential of the surface of the photoconductor is chemically stabilized if it has a suitable size, which provides a higher freedom of combination with toner. In addition, since the ionization potential is suitably suppressed, good energy matching with the foundation can be obtained.

An electron donor group such as an alkyl group or an alkoxy group is added or an electron-attracting group such as phenyl group or an acylic group to adjust the ionization potential of an organic compound. An addition of an antioxidant to suppress modification of material is helpful to adjust the ionization potential.

The ionization potential for use in the present disclosure is determined based on the photoelectron yielding spectrometry by Hisao, Ishii of Chiba University. An example of the measuring results is shown in FIG. 1.

The measuring device was PYS-202 available on the market from Sumitomo Heavy Industries, Ltd. Regarding a spectrum obtained as a graph of the n-th power root (Y axis) of all the electron yield of photoelectrons emitted upon irradiation of homogeneous light in the ultraviolet range obtained as the function of incident light energy (X axis), the energy value of the intersection of the primary approximate straight line (base line) having almost no gradient on the low energy side and a primary approximated straight line having a large gradient on the high energy side is defined as the ionization potential. According to the research made by M. Uda, Jpn. J. Appl. Phys. 24 (1985), 284, n is a figure of 1 or less and 1/2 in the case of a metal. 1/3 is suitable for semiconductors and organic material. In addition, the primary approximated straight line on the low energy side may have a slight gradient depending on the identification of the surface of a photoconductor. The surface of a photoconductor having a gradient of 0 or less is good suppress negative residual images, which is suitable for the present disclosure.

This gradient reflects fluctuation of the ionization potential and is considered to represent the behavior of charge trap of the surface of a photoconductor, which has an impact on the formation of negative residual images.

To suppress the negative residual image, it is preferable to reduce space charge remaining in the photosensitive layer. If each layer and the interface therebetween have such tendency of stocking space charges, unintentional modulation occurs to the surface voltage of a photoconductor. If the conditions of negative residual image are satisfied, such modulation may occur or not occur. The phenomenon is complicated and may be impossible to control. When the photosensitive layer of a photoconductor is formed of two or more layers, it is advantageous that the energy level of each layer has relations of small energy barriers. Specifically, it is possible to suppress unstable behavior about appearance of negative residual images when the difference of the ionization potential between layers is 0.30 eV or less.

The method of manufacturing toner for use in the image forming apparatus of the present disclosure with which latent electrostatic images are developed has no particular limit as long as the difference of the ionization potential between the surface of a photoconductor and the toner is 0.18 eV or less.

The toner for use in the image forming apparatus of the present disclosure has the following formulation. The following embodiment is just representative and the formulation can be suitably changed.

Formulation of Toner

Either of pulverization toner or polymerization toner can be used as the toner for use in the present disclosure as long as the ionization potential between the surface of a photoconductor and the surface of toner meets the predetermined condition specified above. Of these, the following polymerization toner is preferably used to form high quality images.

The polymerization toner is manufactured by a toner manufacturing method including a process of a preparation of a solution or liquid dispersion of toner material, a process of emulsification or dispersion, and a process of removing organic solvents. Crystalline polyester resins are locally present on (close to) the surface of the toner particle.

The crystalline polyester resin is preferably present within 1 μm of the surface of the toner particle.

The crystalline polyester resin quickly diffuses to the toner surface at heating when the crystalline polyester resin having a feature of fixing helping and rapid melting is locally present on (close to) the toner surface. In addition, if the crystalline polyester resin having a small particle diameter is uniformly locally present on (close to) the toner surface, the crystalline polyester resin is not detached from the toner surface in comparison with the case in which blocks of the crystalline polyester resin is attached to the toner surface and the obtained toner has good durability.

First, toner particles are dyed and thereafter segments thereof are made. Therefore, the dyeing material seeps from the surface of the toner particle. Film constituted of resin particulates present on the surface portion of the toner particle is obtained as a clear contrast in an image taken. For example, the film constituted of the resin particulates and the organic component present on the inner side than the film in the toner particle, the film portion and the resin in the toner particle on the inner side than the film portion are discernible.

Next, due to dyeing after the segmentation, crystalline polyester resin is obtained as a clear contrast. The crystalline polyester resin is thinly dyed in comparison with the organic component constituting the inside of the toner. This mechanism is inferred that seeping of the dye material into the crystalline polyester resin is not as strong as into the organic component present on the inner side of the toner due to the difference of density between the two, etc.

Since the amount of ruthenium atom is different depending on contrast density of dyeing, these atoms are present more on the strongly dyed portion so that electron beams do not transmit therethrough, which makes black portion on an observed image while electron beams easily transmits through the weakly dyed portion, which makes white portion on the observed image.

The area of the crystalline polyester resin in the image of the cross section of the toner particle is designated and obtained by image processing to calculate the ratio of the crystalline polyester resin present within 1 μm of the surface of a toner particle. That is, the ratio of the crystalline polyester resin present within 1 μm of the surface of a toner particle can be obtained by calculating the ratio of the crystalline polyester resin present within 1 μm of the surface of a toner particle to the total area of the detected crystalline polyester resin.

Crystalline Polyester Resin

The crystalline polyester resin can be synthesized by reaction between an alcohol component and an acid component. Specific examples of the alcohol component include, but are not limited to, 1,4-butane diol, 1,6-hexane diol, 1,8-octane diol, 1,10-decane diol, 1,12-dodecane diol, and derivatives thereof. Specific examples of the acid component include, but are not limited to, dicarboxylic acids having carbon-carbon double bond or saturated dicarboxylic acids having 2 to 12 carbon atoms, in particular, fumaric acid, 1,4-butane diacid, 1,6-hexane diacid, 1,8-octane diacid, 1,10-decane diacid, 1,12-dodecane diacid, and derivatives thereof. Of these, in terms of reducing the difference between the endothermic peak temperature and the endothermic shoulder temperature, crystalline polyester resins are particularly preferable which are synthesized by at least one alcohol component selected from the group consisting of 1,4-butane diol, 1,6-hexane diol, 1,8-octane diol, 1,10-decane diol, and 1,12-dodecane diol and at least one dicarboxylic acid component selected from the group consisting of 1,4-butane diacid, 1,6-hexane diacid, 1,8-octane diacid, 1,10-decane diacid, and 1,12-dodecane diacid.

To control the crystallinity and the softening point of the crystalline polyester resin, for example, tri- or higher hydric alcohol such as glycerin as the alcohol component and tri- or higher carboxylic acid such as trimellitic anhydride as the acid component are added during the synthesis of polyester to design a condensed polymerized non-linear polyester resin.

The molecule structure of the crystalline polyester resin can be confirmed by NMR measuring of a solution and also a solid, X ray diffraction, GC/MS, LC/MS, infrared (IR) absorption measuring, etc. can be used. Simply, in infrared spectrum, an example is a molecule having adsorption observed at 955 to 975 $cm^{-1}$ or 980 cm to 1,000 $cm^{-1}$ based on olefin δCH (out-of-plane deformation vibration).

In terms that the resin having a low molecular weight and a sharp molecular weight distribution has a good low temperature fixability and thermal storage resistance deteriorates if the resin includes many components having small molecular weights, the molecular weight of the crystalline polyester resin preferably has a peak in a range of from 3.5 to 4.0, a peak half width value of 1.5 or less, a weight average molecular weight (Mw) of from 3,000 to 30,000, a number average molecular weight (Mn) of from 1,000 to 10,000, and an Mw/Mn of from 1 to 10 and more preferably weight average molecular weight (Mw) of from 5,000 to 15,000, a number average molecular weight (Mn) of from 2,000 to 10,000, and an Mw/Mn of from 1 to 5 in the graph of the molecular weight distribution due to gel permeation chromatography (GPC) of a portion soluble in o-dichlorobenzene with an X axis of log (M) and an Y axis of a molecular weight represented in percent by mass.

The acid value of the crystalline polyester resin is preferably 5 mgKOH/g or greater preferably 10 mgKOH/g or greater to obtain target low temperature fixability in terms of affinity between paper and resin. Conversely, to improve hot offset resistance, the acid value is preferably 45 mgKOH/g or less.

The hydroxyl value of the crystalline polyester resin is preferably 50 mgKOH/g or less and more preferably from 5 to 50 mgKOH/g to obtain target low temperature fixability and good chargeability.

The crystalline polyester resin is used as an organic solvent liquid dispersion in which 5 to 25 parts by mass of the crystalline polyester resin is contained in 100 parts by mass of a crystalline polyester resin liquid dispersion. The crystalline polyester resin preferably has an average particle diameter (dispersion diameter) of from 10 to 500 nm.

When the dispersion diameter of the crystalline polyester resin is less than 10 nm, the crystalline polyester resin agglomerates inside a toner particle, which may degrade the effect of imparting chargeability. Conversely, when the dispersion diameter of the crystalline polyester resin surpasses 500 nm, the surface form of toner deteriorates, thereby contaminating carrier so that it is not possible to maintain sufficient chargeability for a long period of time and furthermore, environment stability may be degraded.

The organic solvent liquid dispersion of the crystalline polyester preferably contains 5 parts of the crystalline polyester resin and 5 to 25 parts by mass of a binder resin in 100 parts of the liquid dispersion and more preferably 5 parts of the crystalline polyester resin and 15 parts by mass of a binder resin. When the amount of the binder resin is less than 5 parts by mass, the dispersion diameter of the crystalline resin may not be decreased. When the amount surpasses 25 parts, agglomeration occurs when adding to the solution of the liquid dispersion of the toner material mentioned above. As a consequence, low temperature fixing effect may not be sufficiently obtained.

The crystalline polyester resin liquid dispersion of the present disclosure means preferably an article in which the resin is finely dispersed in the same solvent as the organic solvent for use in toner manufacturing and is used for toner manufacturing while being dispersed in the organic solvent. Due to this, crystalline polyester is present finely dispersed in toner oil droplet when a toner composition is emulsified in an aqueous medium and the crystalline polyester resin being present in the oil droplet can move to the interface between oil and water to demonstrate the features of the toner of the present disclosure. In the present disclosure, the crystalline polyester resin is dissolved in an organic solvent when heated and recrystallized and precipitates when cooled down. This precipitated matter has a larger particle diameter than desired in most cases. Therefore, it is preferable to disperse and pulverize it in the liquid. The article having such a feature and requiring these precipitation and dispersion are disposed in a needle-like form on the surface of a toner particle and secure low temperature fixability, durability, and cleaning property.

The content of the crystalline polyester resin is preferably from 1 to 30 parts by mass to 100 parts by mass of toner. When the content is less than 1 part by mass, sufficient low temperature fixability may not be obtained. When the content is greater than 30 parts by mass, image quality tends to deteriorate due to contamination of a photoconductor or other members, fluidity of a developing agent is easily worsened or the image density tends to become thin since the content of the crystalline polyester resin is present excessively on the surface of the toner. In addition, the surface form of the toner easily deteriorates and the carrier is contaminated so that the chargeability of the toner is not maintained sufficiently for a long period of time and furthermore, the environment stability is inhibited in some cases.

It is preferable that the solution of the liquid dispersion of the toner material include a cation compound and the aqueous medium include anionic resin particulates having an average particle diameter of from 5 to 50 μm and an anionic surfactant to furthermore make the particle diameter distribution sharp without excessively decreasing the particle diameter to small level under high shearing.

The cation compound inferred to have a feature to prevent stabilization of oil droplet of super fine particle and automatically adjust it to have a suitable oil droplet size Moreover, as the ratio of the cation compound increases, the amount of the adsorption of the resin particulate to toner increases. Accordingly, oil droplets are protected, which prevents occurrence of unification.

Next, a case is described in detail in which an aqueous medium contains an anionic resin particulates having an average particle diameter of from 5 to 50 nm and an anionic surfactant.

Resin particulates are attached to the surface of toner particles made of toner material mainly formed of a colorant and a binder resin. Incidentally, the average particle diameter of the toner can be adjusted by the conditions of emulsification and/or dispersion such as stirring of an aqueous medium in the emulsification process.

The anionic resin particulate attaches to the surface of the toner and is fused and merged therewith to form a relatively hard surface. Therefore, the presence of the crystalline polyester resin in the layer of the anionic resin particulate on the surface of the toner is preferable in terms of demonstration of good durability. In addition, since the resin particulate is anionic, the resin particulate adsorbs to liquid droplets including toner material and prevents unification of the liquid droplets, which is suitable to control the particle size distribution of the toner. Moreover, it imparts negative chargeability to the toner. To demonstrate such features, it is preferable that the anionic resin particulate has an average particle diameter of from 5 to 50 nm.

Resin Particulate

The resin in the resin particulate has no particular limit as long as the resin can form an aqueous liquid dispersion in an aqueous medium. It can be suitably selected among known resins to suit to a particular application. Thermoplastic resins or thermocurable resins can be such resins for the resin particulate.

Specific examples include, but are not limited to, vinyl resins, polyurethane resins, epoxy resins, polyester resins, polyamide resins, polyimide resins, silicone resins, phenolic resins, melamine resins, urea resins, aniline resins, ionomer resins, and polycarbonate resins. These can be used alone or in combination. Of these, vinyl resins, polyurethane resins, epoxy resins, polyester resins, and mixtures thereof are particularly preferable because an aqueous liquid dispersion including fine spherical resin particulate can be easily prepared.

Specific examples of the vinyl resins include, but are not limited to, polymers, which are prepared by polymerizing a vinyl monomer or copolymerizing vinyl monomers, such as styrene-(meth)acrylate resins, styrene-butadiene copolymers, (meth)acrylic acid-acrylate copolymers, styrene-acrylonitrile copolymers, styrene-maleic anhydride copolymers, and styrene-(meth)acrylic acid copolymers.

Anionic resin particulates are preferable. This is suitable to prevent agglomeration when used with the anionic surfactant mentioned above. Such anionic resin particulates can be manufactured by using an anionic activator or introducing an anionic group such as a carboxylic acid group or a sulfonic acid group into a resin according to the method described later.

The resin particulate preferably has an average primary particle diameter of from 5 to 50 nm to control the particle diameter and the particle diameter distribution of emulsified particles and more preferably from 10 to 25 nm.

The average primary particle diameter of the resin particulate can be measured by scanning electron microscopy (SEM), transmission electron microscopy (TEM), a light scattering method, etc. Preferably, using LA-920 (manufactured by Horiba Ltd.) according to a laser scattering measuring method, the particle diameter is measured after suitable dilution to make the diameter within an appropriate measuring range. The particle diameter is obtained as the volume average particle diameter.

Resin particulates have no particular limit and can be obtained through polymerization utilizing any known method. It is preferable to obtain the resin particulate as an aqueous liquid dispersion thereof. For example, as the method of preparing an aqueous liquid dispersion of the resin particulates, the following methods are suitable.

(1) In a case of a vinyl resin, a method of manufacturing an aqueous liquid dispersion of resin particulates directly from a polymerization reaction selected from a suspension polymerization method, an emulsion polymerization method, a seed polymerization method, or a dispersion polymerization method using a vinyl monomer as the starting material of the resin particulates.

(2) In a case of a polyaddition-based or polycondensation-based resin such as a polyester resin, a polyurethane resin, and an epoxy resin, a method of manufacturing an aqueous liquid dispersion of resin particulates by: dispersing a precursor (monomer, oligomer, etc.) or its solvent solution under the presence of a suitable dispersion agent; and curing the liquid dispersion by heating or addition of a curing agent.

(3) In a case of a polyaddition or polycondensation resin such as a polyester resin, a polyurethane resin and an epoxy resin, a method of manufacturing an aqueous liquid dispersion of resin particulates by dissolving a suitable emulsification agent in a precursor (monomer, oligomer, etc.) or its solvent solution (liquid is preferred, possibly liquidized by heating) followed by adding water for phase change emulsification.

(4) A method of pulverizing a resin preliminarily manufactured by a polymerization reaction (addition polymerization, ring scission polymerization, polyaddition, addition condensation, polycondensation, etc.) with a fine grinding mill of a mechanical rotation type or jet type, classifying the resultant to obtain resin particulates, and dispersing the resin particulates in water under the presence of a suitable dispersion agent.

(5) A method of spraying a resin solution in which a preliminarily manufactured resin by a polymerization reaction (addition polymerization, ring scission polymerization, polyaddition, addition condensation, polycondensation, etc.) is dissolved in a solvent in a form of a fine liquid mist to obtain resin particulates followed by dispersion thereof in water under the presence of a suitable dispersion agent.

(6) A method of adding a solvent to a resin solution in which a preliminarily manufactured resin by a polymerization reaction (addition polymerization, ring scission polymerization, polyaddition, addition condensation, polycondensation, etc.) is dissolved in a solvent or cooling down a resin solution preliminarily prepared by dissolving the resin in a solvent by heating to precipitate resin particulates; removing the solvent to obtain the resin particulates; and dispersing them in water under the presence of a dispersion agent.

(7) A method of dispersing a resin solution in which a preliminarily manufactured resin by a polymerization reaction (addition polymerization, ring scission polymerization, polyaddition, addition condensation, polycondensation, etc.) is dissolved in a solvent in an aqueous medium under the presence of a suitable dispersant; and removing the solvent by heating, reduced pressure, etc. (8) A method of dissolving a suitable emulsifying agent in a resin solution in which a preliminarily manufactured resin by a polymerization reaction (addition polymerization, ring opening polymerization, polyaddition, addition condensation, polycondensation, etc.) is dissolved in a solvent; and adding water to the solution for phase change emulsification.

Anionic Surfactant

Specific examples of anionic surfactants include, but are not limited to, alkylbenzene sulfonic acid salts, α-olefin sulfonic acid salts, and phosphoric acid esters. An anionic surfactant having a fluoroalkyl group is preferable. Specific examples of the anionic surfactants having a fluoroalkyl group include, but are not limited to, fluoroalkyl carboxylic acids having 2 to 10 carbon atoms and their metal salts, disodium perfluorooctane sulfonylglutamate, sodium 3-{(omega-fluoroalkyl(having 6 to 11 carbon atoms)oxy}-1-alkyl(having 3 to 4 carbon atoms) sulfonate, sodium 3-{omega-fluoroalkanoyl(having 6 to 8 carbon atoms)-N-ethylamino}-1-propanesulfonate, fluoroalkyl(having 11 to 20 carbon atoms) carboxylic acids and their metal salts, perfluoroalkylcarboxylic acids and their metal salts, perfluoroalkyl(having 4 to 12 carbon atoms)sulfonate and their metal salts, perfluorooctanesulfonic acid diethanol amides, N-propyl-N-(2-hydroxyethyl)perfluorooctanesulfone amide, perfluoroalkyl(having 6 to 10 carbon atoms)sulfoneamidepropyltrimethylammonium salts, salts of perfluoroalkyl(having 6 to 10 carbon atoms)-N-ethylsulfonyl glycin, and monoperfluoroalkyl(having 6 to 16 carbon atoms)ethylphosphates.

Specific examples of the anionic surfactants having a fluoroalkyl group available on the market include, but are not limited to, SURFLON S-111, S-112 and S-113, which are manufactured by Asahi Glass Co., Ltd.; FRORARD FC-93, FC-95, FC-98 and FC-129, which are manufactured by Sumitomo 3M Ltd.; UNIDYNE DS-101 and DS-102, which are manufactured by Daikin Industries, Ltd.; MEGAFACE F-110, F-120, F-113, F-191, F-812 and F-833 which are manufactured by DIC Corporation; ECTOP EF-102, 103, 104, 105, 112, 123A, 306A, 501, 201 and 204, which are manufactured by Tohchem Products Co., Ltd.; and FUTARGENT F-100 and F150 manufactured by Neos Company limited.

In addition, dodecyl diphenyl ether sodium sulfonate is inexpensive and easily available causing no safety problem.

Cationic Compound

In the present disclosure, as the cation compound to prevent occurrence of super fine emulsification liquid droplets in combination with the resin particulate and anionic surfactants during emulsification and intensively dispose the crystalline polyester resin on the surface of toner, basic compounds such as amines and ammonium salts are suitable. In addition, diamine compounds and triamine compounds are also preferable.

Aliphatic or aromatic primary amines, secondary amines, and tertiary amines are preferable and the first amines and the second amines are particularly preferable.

Specific examples include, but are not limited to, butylamine, propylamine, ethylene diamine, hexamethylene diamine, isophorone diamine, aniline, o-toluidine, p-phenylenediamine, and α-naphtyl amine. Amines specified as the compound including active hydrogen reactive with a reactive polyester, which are described later, are also preferable.

Toner Material

The toner material includes at least a compound having an active hydrogen group and modified polyester resins as polymers reactive with the compound having an active hydrogen group. It also includes a binder resin, a colorant, and other optional components such as releasing agent, resin particulates, and charge control agent.

Binder Resin

The binder resin contained in the toner material has no particular limit and can be suitably selected to suit to a particular application. Specific examples include, but are not limited to, polyester-based resins, silicone resins, styrene-acrylic resins, styrene resins, acrylic resins, epoxy resins, diene-based resins, phenol resins, terpene resins, coumalin resins, amideimide resins, butyral resins, urethane resins, and ethylene-vinyl-chloride resins. Of these, polyester-based resins are preferable in that the polyester-based resin is sharp-melt during fixing and the surface of an image can be smoothed so that it has sufficient flexibility even the molecular weight thereof decreases. A combination of polyester-based resins and other resins are also suitable.

The polyester-based resin represents resins formed of polyestrization of at least one polyol represented by the following Chemical formula 1: $A\text{-}(OH)_m$ and at least one kind of polycarboxylic acid represented by the following chemical formula 2: $B\text{—}(COOH)_n$. In the Chemical formula 1, A represents an aromatic group or a heterocyclic aromatic group that may have an alkyl group, an alkylene group, or a substitution group having 1 to 20 carbon atoms and m represents an integer of from 2 to 4. In the Chemical formula 2, B represents an aromatic group or a heterocyclic aromatic group that may have an alkyl group, an alkylene group, or a substitution group having 1 to 20 carbon atoms and n represents an integer of from 2 to 4.

The polyol represented by the Chemical formula 1 has no particular limit and can be suitably selected to suit to a particular application.

Specific examples include, but are not limited to, ethylene glycol, diethylene glycol, triethylene glycol, 1,2-propylene glycol, 1,3-propylene glycol, 1,4-butane diol, neopentyl glycol, 1, 4-butene diol, 1,5-pentane diol, 1,6-hexane diol, 1,4-cyclohexane dimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentane triol, glycerol, 2-methylpropane triol, 2-methyl-1,2,4-butanetriol, trimethylol ethane, trimethylol propane, 1,3,5-trihydroxy benzene, bisphenol A, an adduct of bisphenol A with propylene oxide, hydrogenated bisphenol A, an adduct of hydrogenated bisphenol A with ethylene oxide, and an adduct of hydrogenated bisphenol A with propylene oxide.

The polycarboxylic acid represented by Chemical formula 2 has no particular limit and can be suitably selected to suit to a particular application.

Specific examples include, but are not limited to, maleic acid, fumaric acid, citraconic acid, itaconic acid, glutaconic acid, phthalic acid, isophthtalic acid, terephthalic acid, succinic acid, adipic acid, sebacic acid, azelaic acid, maronic acid, n-dodecenyl succinic acid, isooctyl succinic acid, isododecenyl succinic acid, n-octenyl succinic acid, n-octyl succinic acid, isooctenyl succinic acid, 1,2,4-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxyl-2-methyl-2-methylene carboxy propane, 1,2,4-cyclohexane tricarboxylic acid, tetra(methylenecarboxyl)methane, 1,2,7,8-octane tetracarboxylic acid, pyromellitic acid, Empol® trimer acid, cyclohexane dicarboxylic acid, cyclohexene dicarboxylic acid, butane tetracarboxylic acid, diphenyl sulfone tetracarboxylic acid, and ethylene glycol bis(trimellitic acid).

Compound Having Active Hydrogen Group

In the present disclosure, since the toner material includes a compound having an active hydrogen compound and a modified polyester resin reactive with the compound having an active hydrogen compound, mechanical strength of the obtained toner is enhanced so that it is possible to suppress burial of resin particulates and external additives.

When the compound having an active hydrogen group has a cationic polarity, the compound can electrostatically attract resin particulates. In addition, fluidity during heating fixing of toner can be adjusted to widen the fixing temperature range. The modified polyester resin reactive with the compound having an active hydrogen group can be referred to as a binder resin precursor.

The compound having an active hydrogen group serves as an elongation agent, cross-linking agent, etc. in the elongation reaction, cross-linking reaction, etc. of the polymer reactive with the compound having active hydrogen groups in an aqueous medium. Any known compound having an active hydrogen group can be suitably used as the compound having an active hydrogen group and it can be suitably selected to suit to a particular application. For example, amines (B) are preferable when the polymer reactive with the compound having an active hydrogen groups is a polyester prepolymer (A) having an isocyanate group because the resultant polymer can have a large molecular weight through elongation reaction, cross-linking reaction, etc. with the polyester prepolymer (A) having an isocyanate group.

The active hydrogen group has no particular limit and any group having an active hydrogen is suitable. It can be suitably selected to suit to a particular application. For example, hydroxyl group (alcoholic hydroxyl group or phenolic hydroxyl group), amino group, carboxyl group, and mercapto group can be suitably used. These can be used alone or in combination.

The amines (B) have no particular limit and can be suitably selected to suit to a particular application.

Specific examples include, but are not limited to, diamines (B1), polyamines (B2) having three or more amino groups, amino alcohols (B3), amino mercaptans (B4), amino acids (B5), and blocked amines (B6) in which the amines (B1-B5) mentioned above are blocked. These can be used alone or in combination. Of these, dimine (B1) and a mixture of diamine (B1) with a minute amount of polyamines (B2) having three or more amino groups are particularly preferable.

Specific examples of the diamines (B1) include, but are not limited to, aromatic diamines, alicyclic diamines, and aliphatic diamines.

Specific examples of the aromatic diamines include, but are note limited to, phenylenediamines, diethyl toluene diamines, and 4,4'-diaminodiphenylmethane.

Specific examples of the alicyclic diamines include, but are not limited to, 4,4'-diamino-3,3-dimethyl dicyclohexyl methane, diaminocyclohexane, and isophoron diamine. Specific examples of the aliphatic diamines include, but are not limited to, ethylene diamine, tetramethylene diamine, and hexamethylenediamine.

Specific examples of the polyamines (B2) having three or more amino groups include, but are not limited to, diethylenetriamine, and triethylene tetramine. Specific examples of the amino alcohols (B3) include, but are not limited to, ethanol amine and hydroxyethyl aniline. Specific examples of the amino mercaptan (B4) include, but are not limited to, aminoethyl mercaptan and aminopropyl mercaptan. Specific examples of the amino acids (B5) include, but are not limited to, amino propionic acid and amino caproic acid.

Specific examples of the blocked amines (B6) include, but are not limited to, ketimine compounds which are prepared by reacting one of the amines (B1) to (B5) mentioned above with a ketone such as acetone, methyl ethyl ketone and methyl isobutyl ketone, oxazoline compounds, etc.

A reaction terminator can be used to terminate the elongation reaction, cross-linking reaction, etc. of the compound having an active hydrogen group with the polymer reactive with the compound having an active hydrogen group.

The molecular weight, etc. of the adhesive base material can be controlled in a desired range by using a reaction terminator. Specific examples of the reaction terminator include, but are not limited to, monoamines (e.g., diethylamine, dibutyl amine, butyl amine and lauryl amine) and blocked amines (i.e., ketimine compounds) prepared by blocking the monoamines mentioned above.

The mixing ratio of the polyester prepolymer (A) having an isocyanate group to the amines (B), i.e., the equivalent mixing ratio ([NCO]/[NHx]) of the isocyanate group [NCO] contained in the prepolymer (A) having an isocyanate group to the amino group [NHx]contained in the amines (B), is preferably from 1/3 to 3/1, more preferably from 1/2 to 2/1, and furthermore preferably from 1/1.5 to 1.5/1. When the mixing equivalent ratio ([NCO]/[NHx]) is less than 1/3, the low temperature fixing temperature may become lower. When the ratio surpasses 3/1, the molecular weight of the urea-modified polyester resin tends to decrease, which leads to deterioration of hot offset resistance.

Polymer Reactive with Compound Having Active Hydrogen Group

Any known polymer having at least a portion reactive with a compound having an active hydrogen group (hereinafter referred to as prepolymer) can be suitably used as the polymer reactive with the compound having an active hydrogen group and it can be suitably selected from known resins, etc.

Specific examples include, but are not limited to, polyol resins, polyacrylic resins, polyester resins, epoxy resins, and derivatives thereof. These can be used alone or in combination. Of these, polyester resins are particularly preferable in terms of high fluidity and transparency during melting.

The portion reactive with the compound having an active agent group in the prepolymer has no particular limit and can be suitably selected from known substitution groups.

Specific examples include, but are not limited to, isocyanate group, epoxy group, carboxylic acid, and acid chloride group. These can be used alone or in combination. Of these, isocyanate group is particularly preferable. Of the prepolymer, polyester resins having a urea-bond producing group (RMPE) are particularly preferable in terms that oil-free low temperature fixing property in dry toner and in particular good releasing property and good fixability can be secured even when there is no releasing oil application mechanism to a heating medium for fixing.

A specific example of the urea-bond producing group is an isocyanate group. When the urea-bond producing group in the polyester resins having a urea-bond producing group (RMPE) is isocyanate group, polyester prepolymer (A) having an isocyanate group, etc. are particularly preferable as the polyester resin (RMPE).

The polyester prepolymer (A) having an isocyanate group has no particular limit and can be suitably selected to a particular application.

An example thereof is a polycondensation of a polyol (PO) and a polycarboxylic acid (PC) obtained by reaction between a polyester resin having an active hydrogen group and a polyisocyanate (PIC). There is no specific limitation to polyol (PO) and it can be suitably selected to a particular application. Examples are diol (DIO), tri- or higher alcohol (TO), and a mixture of a polyol (TO) and a diol (DIO). These can be used alone or in combination. Of these, a simple diol (DIO) or a mixture in which a small amount of a polyol (TO) is mixed with a diol (DIO) is preferable.

Specific examples of diol (DIO) include, but are not limited to, alkylene glycol, alkylene etherglycol, alicyclic diols, adducts of alicyclic diol with alkylene oxide, bisphenols, and adducts of bisphenol with alkylene oxide.

As alkylene glycol, articles having 2 to 12 carbon atoms are preferable.

Specific examples include, but are not limited to, ethylene glycol, 1,2-propylene glycol, 1,3-propylene glycol, 1,4-butanediol, and 1,6-hexanediol. Specific examples of the alkylene ether glycol include, but are not limited to, diethylene glycol, triethylene glycol, dipropylene glycol, polyethylene glycol, polypropylene glycol, and polytetramethylene ether glycol. Specific examples of the alicyclic diols include, but are not limited to, 1,4-cyclohexane dimethanol and hydrogenated bisphenol A. Specific examples of the adducts of alycyclic diol with alkylene oxides include, but are not limited to, adducts of alicyclic diol with alkylene oxides such as ethylene oxide, propylene oxide, and butylene oxide. Specific examples of bisphenol include, but are not limited to, bisphenol A, bisphenol F, and bisphenol S.

Specific examples of the adducts of bisphenol with alkylene oxides include, but are not limited to, adducts of bisphenols with alkylene oxides such as ethylene oxide, propylene oxide, and butylene oxide.

Of these, alkylene glycol having 2 to 12 carbon atoms or adducts of bisphenols with alkylene oxide are preferable.

An adduct of a bisphenol with an alkylene oxide and a mixture of an adduct of a bisphenol with an alkylene oxide and an alkylene glycol having a 2 to 12 carbon atoms are particularly preferable.

As the polyols (1-2) having three or more alcohol groups, polyols having three to eight or more alcohol groups are preferable.

Specific examples include, but are not limited to, polyaliphatic alcohols having three or more alcohol groups, polyphenols having three or more alcohol groups, and adducts of the polyphenols having three or more alcohol groups with an alkylene oxide. Specific examples of the polyaliphatic alcohols having three or more hydroxyl groups include, but are not limited to, glycerin, trimethylol ethane, trimethylol propane, pentaerythritol, and sorbitol. Specific examples of the polyphenols having three or more hydroxyl groups include, but are not limited to, trisphenol (trisphenol PA, manufactured by HONSHU CHEMICAL INDUSTRY CO., LTD.), phenol novolac, and cresol novolac. Specific examples of the adducts of polyphenols having three or more hydroxyl groups with alkylene oxides include, but are not limited to, adducts of polyphenols having three or more hydroxyl groups with alkylene oxides such as ethylene oxide, propylene oxide, and butylene oxide.

The mixing ratio in mass of diol (DIO) to polyol (TO) having three or more hydroxyl groups in the mixture of diol (DIO) and polyol (TO) having three or more hydroxyl groups is preferably from 100:001 to 10 and more preferably from 100:0.01 to 1.

There is no specific limitation to polcarboxylic acid (PC) and it can be suitably selected to a particular application. Examples are dicarboxylic acid (DIC), polycarboxylic acid (TC) having three or more carboxylic groups, and a mixture of dicarboxylic acid (DIC) and polycarboxylic acid (TC) having three or more carboxylic groups.

These can be used alone or in combination. Of these, a simple dicarboxylic acid (DIC) or a mixture in which a small amount of polycarboxylic acid (TC) having three or more carboxylic groups is mixed with a dicarboxylic acid (DIC) is preferable.

Specific examples of the dicarboxylic acid (DIC) include, but are not limited to, alkylene dicarboxylic acid, alkylene dicarboxylic acid, and an aromatic dicarboxylic acid. Specific examples of the alkylene dicarboxylic acid include, but are not limited to, succinic acid, adipic acid, and sebacic acid. In particular, alkenylene dicarboxylic acid having 4 to 20 carbon atoms are preferable.

Specific examples include, but are not limited to, maleic acid and fumaric acid. Also, aromatic dicarboxylix acids having 4 to 20 carbon atoms are preferable.

Specific examples include, but are not limited to phthalic acid, isophtalic acid, terephthalic acid, and naphthalene dicarboxylic acid. Of these compounds, alkenylene dicarboxylic acids having 4 to 20 carbon atoms and aromatic dicarboxylic acids having 8 to 20 carbon atoms are preferable.

Polyols polycarboxylic acid having three to eight or more carboxylic groups are preferable. For example, aromatic polycarboxylic acids are preferable. In addition, aromatic polycarboxylic acid having 9 to 20 carbon atoms are preferable. Specific examples include, but are not limited to, trimellitic acid and pyromellitic acid.

Examples of the polycarboxylic acids (PC) are acid anhydride or lower alkyl esters of articles selected from the group consisting of dicarboxylic acid (DIC), polycarboxylic acid (TC) having three or more carboxylic groups, and a mixture of dicarboxylic acids (DIC) and carboxylic acids (TC) having three or more carboxylic groups. Specific examples of the lower alkyl esters include, but are not limited to, methyl esters, ethyl esters, and isopropyl esters.

The mixing ratio (DIC:TC) in mass of dicarboxylic acid (DIC) to polycarboxylic acid (TC) having three or more carboxylic groups in the mixture of dicarboxylic acid (DIC) and polycarboxylic acid (TC) having three or more carboxylic groups has no particular limit and can be suitably selected to suit to a particular application. For example, it is preferably from 100:001 to 10 and more preferably from 100:0.01 to 1.

The mixing ratio of the polyol (PO) and the polycarboxylic acid (PC) mentioned above in polycondensation reaction has no particular limit and can be suitably selected to suit to a particular application. For example, the equivalent ratio ([OH]/(COOH)) of hydroxyl group [OH} in the polyol (PO) to carboxyl group {COOH} in the polycarboxylic acid (PC) is preferably from 2/1 to 1/1, more preferably from 1.5/1 to 1/1, and particularly preferably from 1.3/1 to 1.02/1.

There is no specific limit to the content of the polyol (PO) in the polyester prepolymer (A) having an isocyanate group and it can be suitably selected to suit to a particular application. For example, the proportion is preferably from 0.5 to 40 percent by mass, more preferably from 1 to 30 percent by mass, and particularly preferably from 2 to 20 percent by mass. When the proportion is less than 0.5 percent by mass, hot offset resistance may deteriorate, which causes a trade-off between high temperature storage stability and low temperature fixability of toner. Conversely, when the proportion is greater than 40 percent by mass, low temperature fixability of the toner easily deteriorates.

The polyisocyanate (PIC) mentioned above have no particular limit and can be suitably selected to suit to a particular application. Aliphatic polyisocyanates, alicyclic polyisocyanates, aromatic diisoycantes, aromatic aliphatic diisocyanates, isocyanurates, phenol derivatives thereof, and blocked polyisocyanates in which the polyisocyanates mentioned above are blocked with oximes or caprolactams.

Specific examples of the aliphatic polyisocyanates include, but are not limited to, tetramethylene diisocyanate, hexamethylene diisocyanate, 2,6-diisocyanate methylcaproate, octamethylene diisocyanate, decamethylene diisocyanate, dodecamethylene diisocyanate, tetradecamethylene diisocyanate, trimethyl hexane diisocyanate, and tetramethyl hexane diisocyanate. Specific examples of the alicyclic diisocyanate include, but are not limited to, isophorone diisocyanate and cyclohexylmethane diisocyanate. Specific examples of the aromatic diisoycantes include, but are not limited to, tolylene diisocyanate, diphenylmethane diisocyanate, 1,5-naphtylene diisocyanate, diphenylene-4,4'-diisocyanate, 4,4-diisocyanate-3,3'-di methyldiphenyl, 3-methyl diphenylmethane-4,4'-diisocyanate, and diphenyl ether-4,4'-diisocyanate. A specific example of the aromatic aliphatic diisocyanates is α, α, α', α'-tetramethyl xylylene diisocyanate. Specific examples of the isocyanurates include, but are not limited to, tris-isocyanate alkyl-isocyanulate, and triisocyanate cycloalkyl-isocyanulate. These can be used alone or in combination.

The mixing ratio of the polyisocyanate (PIC) and the polyester resin having an active hydrogen group (for example, polyester resin having a hydroxyl group) in the reaction thereof is that the mixing equivalent ratio ([NCO]/[OH]) of isocyanate group [NCO] in the polyisocyanate (PIC) to hydroxyl group [OH} in the polyester resin having a hydroxyl group is preferably from 5/1 to 1/1, more preferably from 4/1 to 1.2/1, and particularly preferably from 3/1 to 1.5/1. When the mixing equivalent ratio of the isocyanate group [NCO} surpasses 5, low temperature fixability may deteriorate. Conversely, when it is less than 1, offset resistance tends to deteriorate.

There is no specific limit to the proportion of the polyisocyanate (PIC) in the polyester prepolymer (A) having an isocyanate group and it can be suitably selected to suit to a particular application. For example, the proportion is preferably from 0.5 to 40 percent by mass, more preferably from 1 to 30 percent by mass, and particularly preferably from 2 to 20 percent by mass. When the proportion is less than 0.5 percent by mass, hot offset resistance may deteriorate, which causes a trade-off between heat resistance storage property and low temperature fixability. Conversely, when the proportion is greater than 40 percent by mass, low temperature fixability of the toner easily deteriorates.

In addition, the average number of the isocyanate groups per molecule of the polyester prepolymer (A) having an isocyanate group is preferably 1 or more, more preferably from 1.2 to 5, and furthermore preferably from 1.5 to 4. When the average number is less than 1, the molecular weight of polyester resin (RMPE) modified by a urea-bond producing group decreases, which may lead to deterioration of hot offset resistance.

The mass average molecular weight (Mw) of the polymer reactive with the compound having an active hydrogen group is preferably from 3,000 to 40,000 and more preferably from 4,000 to 30,000 in the molecular weight distribution by gel permeation chromatography (GPC) of portion soluble in tetrahydrofuran. When the mass average molecular weight (Mw) is less than 3,000, high temperature storage stability tends to deteriorate. When the mass average molecular weight (Mw) is greater than 40,000, low temperature fixability tends to deteriorate.

The molecular weight distribution by the gel permeation chromatography (GPC) can be measured by, for example, the following method. That is, a column is stabilized in a heat chamber at 40 degrees C.; tetrahydrofuran (THF) as the column solvent is caused to flow in the column at this temperature at a flow speed of 1 ml per minute; and 50 to 200 µl of a THF sample solution of a resin prepared to have a sample concentration of from 0.05 to 0.6 percent by mass is infused into the column for measuring. With regard to the measuring of the molecular weight, the molecular weight distribution of the sample is calculated by the relation between the count number and the logarithm values of the calibration curve created from several kinds of the monodispersed polystyrene standard samples. As the standard polystyrene sample for the calibration curve, it is preferable to use at least about ten standard polystyrene samples using, for example, polystyrene samples having a molecular weight of $6 \times 10^2$, $2.1 \times 10^2$, $4 \times 10^2$, $1.75 \times 10^4$, $1.1 \times 10^5$, $3.9 \times 10^5$, $8.6 \times 10^5$, $2 \times 10^5$, $2 \times 10^6$, and $4.48 \times 10^6$, manufactured by TOSOH CORPORATION or Pressure Chemical Co. A refractive index (RI) detector can be used as detector.

Colorant

The colorant has no particular limit and can be suitably selected from known dyes and pigments to suit to a particular application.

Specific examples include, but are not limited to, carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, and mixtures thereof. These can be used alone or in combination.

There is no specific limit to the proportion of the colorant in toner and it can be suitably selected to suit to a particular application. The proportion is preferably from 1 to 15 percent by mass and more preferably from 3 to 10 percent by mass. When the proportion is less than 1 percent by mass, the coloring performance of the toner tends to deteriorate. When the proportion is greater than 15 percent by mass, dispersion of the pigment in the toner tends to be poor, thereby degrading the coloring performance and the electric characteristics of the toner in some cases.

The colorant and the resin can be used in combination as a master batch. There is no specific limitation to the resin and it can be suitably selected from known resins to suit to a particular application.

Specific examples include, but are not limited to, polyester resins, styrene or substituted polymers thereof, styrene-based copolymers, polymethyl methacrylate resins, polybutyl methacrylate resins, polyvinyl chloride resins, polyvinyl acetate resins, polyethylene resins, polypropylene resins, epoxy resins, epoxy polyol resins, polyurethane resins, polyamide resins, polyvinyl butyral resins, polyacrylic resins, rosin, modified rosins, terpene resins, aliphatic hydrocarbon resins, alicyclic hydrocarbon resins, aromatic petroleum resins, chlorinated paraffin, and paraffin wax. These can be used alone or in combination.

Specific examples of styrene-based copolymers or substituted polymers of styrene include, but are not limited to, polyester resins, polystyrene resins, poly(p-chlorostyrene) resins, and polyvinyl toluene resins.

Specific examples of the styrene-based copolymers include, but are not limited to, styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-methyl-chloromethacrylate copolymers, styrene-acrylonitrile copolymers, styrene-methyl vinyl ketone copolymers, styrene-butadiene copolymers, styrene-isoprene copolymers, styrene-acrylonitrile-indene copolymers, styrene-maleic acid copolymers, and styrene-maleic acid ester copolymers.

The master batch is prepared by mixing or mixing and kneading a resin for a master batch resin and a colorant upon application of high shearing stress thereto. In this case, it is preferable to add an organic solvent to boost interaction between the coloring agent and the resin. In addition, so-called flushing methods are advantageous in that there is no need to drying because a wet cake of the coloring agent can be used as they are. In the flushing method, a water paste containing water of a colorant is mixed or kneaded with an organic solvent and the colorant is transferred to the resin side to remove water and the organic solvent component. High shearing dispersion devices such as a three-roll mill, etc. can be suitably used for mixing or mixing and kneading. Colorants are known to degrade the charging performance of toner when the colorant is present on the surface of the toner. Therefore, it is suitable to improve affinity between the resin for the master batch and the colorant to enhance the charging performance (environment stability, charge carrying power, size of charges, etc.) of the toner.

Releasing Agent

There is no specific limit to the releasing agent and it can be suitably selected to suit to a particular application. For example, a releasing agent having a low melting point of from 50 to 120 degrees C. is preferable. When a releasing agent having such a low melting point is dispersed with the resin mentioned above, it works efficiently as release agent at the interface between a fixing roller and the toner. For this reason, hot offset resistance is good even in an oil-free case (in which no releasing agent such as oil is applied to a fixing roller).

Waxes are preferably used as the releasing agent.

Specific examples of such waxes include, but are not limited to, natural waxes, for example, plant waxes such as carnauba wax, cotton wax, vegetable wax, and rice wax; animal waxes such as bee wax and lanolin; mineral waxes such as ozokerite; petroleum waxes such as paraffin, microcrystalline, and petrolatum. In addition to these natural waxes, synthesis hydrocarbon waxes such as Fischer-Tropsch wax and polyethylene wax and synthesis wax such as ester, ketone, and ether are also usable. Furthermore, aliphatic acid amide such as 12-hydroxystearic acid amide, stearic acid amide, phthalic acid anhydride imide, and chlorinated hydrocarbons; crystalline polymer resins having a low molecular weight such as homo polymers, for example, poly-n-stearylic methacrylate and poly-n-lauryl methacrylate, and copolymers (for example, copolymers of n-stearyl acrylate-ethylmethacrylate); and crystalline polymer having a long alkyl group in the branched chain are also usable. These can be used alone or in combination.

There is no specific limit to the melting point of the releasing agent and it can be suitably selected to suit to a particular application. For example, the melting point is preferably from 50 to 120 degrees C. and more preferably from 60 to 90 degrees C. When the melting point of the releasing agent is lower than 50 degrees C., it may have an adverse impact on high temperature storage stability. When the melting point is higher than 120 degrees C., a cold offset easily occurs at a low fixing temperature during fixing. The releasing agent preferably has a melt viscosity of from 5 cps to 1,000 cps and more preferably from 10 cps to 100 cps at a temperature 20 degrees C. higher than the melting point of the wax (releasing agent). When the melt viscosity is lower than 5 bps, the releasing property may deteriorate. When the melt viscosity is greater than 1,000 cps, effect of improving hot offset resistance and low temperature fixing property may not be obtained.

There is no specific limit to the proportion of the releasing agent in the toner and it can be suitably selected to suit to a particular application. For example, the proportion is preferably 40 percent by mass or less and more preferably from 3 to 30 percent by mass. When the proportion of the releasing agent is greater than 40 percent by mass, fluidity of the toner may deteriorate.

Charge Control Agent

There is no specific limit to the selection of the charge control agent and it can be suitably selected to suit to a particular application. Specific examples of thereof include, but are not limited to, nigrosine dyes, triphenylmethane dyes, chrome containing metal complexes, chelate compounds of molybdic acid, Rhodamine dyes, alkoxyamines, quaternary ammonium salts (including fluorine-modified quaternary ammonium salts), alkylamides, phosphor and compounds including phosphor, tungsten and compounds including tungsten, fluorine-containing activators, metal salts of salicylic acid and metal salts of salicylic acid derivatives. These can be used alone or in combination.

The charge control agent is available on the market. Examples of the marketed product are resins or compounds having electron donating functional groups, azo dyes, or metal complexes of organic acids. Specific examples of the marketed products of the charge control agents include, but are not limited to, BONTRON 03 (Nigrosine dyes), BONTRON P-51 (quaternary ammonium salt), BONTRON S-34 (metal-containing azo dye), E-82 (metal complex of oxynaphthoic acid), E-84 (metal complex of salicylic acid), and E-89 (phenolic condensation product), which are manufactured by Orient Chemical Industries Co., Ltd.; TN 105 (metal complex of salicylic acid), and TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and NX VP434 (quaternary ammonium salt), which are manufactured by Hoechst AG; LRA-901, and LR-147 (boron complex), which are manufactured by Japan Carlit Co., Ltd., copper phthalocyanine, perylene, quinacridone, azo pigments and polymers having a functional group such as a sulfonate group, a carboxyl group, a quaternary ammonium group, etc.

The charge control agent can be arbitrarily added to the resin phase in toner by utilizing the difference of affinity to the resins in the toner. If the charge control agent is selectively contained in the resin phase present inside of toner, it is possible to restrain spent of the charge control agent on members such as photoconductor, carrier, etc. The toner for use in the present disclosure relatively has a freedom of designing the disposition of a charge control agent so that the charge control agent can be arbitrarily disposed depending on each image forming process.

Inorganic Particulate

The inorganic particulates are used to impart fluidity, developability, chargeability, etc. as external additive to toner. There is no specific limit to the inorganic particulate and it can be suitably selected among known inorganic particulates to suit to a particular application.

Specific examples include, but are not limited to, silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, silicon nitride, etc. These can be used alone or in combination.

Inorganic particulates to improve flowability, developability, and chargeability preferably has a small particle diameter in addition to large inorganic particulates having an average primary particle diameter of from 80 to 500 nm. In particular, hydrophobic silica and hydrophobic titanium oxide are preferable. The average primary particle diameter of the inorganic particulate preferably is from 5 to 50 nm and more preferably from 10 to 30 nm. In addition, it is preferable that the specific surface as measured by BET method be 20 to 500 $m^2/g$. The proportion of the inorganic particulate is preferably from 0.01 to 5 percent by mass and more preferably from 0.01 to 2.0 percent by mass.

There is no specific limitation to the other components and it can be suitably selected to suit to a particular application.

Specific examples include, but are not limited to, a fluidity improver, a cleaning property improver, a magnetic material, and metal soap.

The fluidity improver is prepared by surface treatment to improve the hydrophobic property and prevent deterioration of the fluidity and the chargeability even in a humid environment.

Specific examples of the fluidity improver include, but are not limited to, silane coupling agents, silylatng agents, silane coupling agents including an alkyl fluoride group, organic titanate coupling agents, aluminum containing coupling agents, silicone oil, and modified silicone oil. Silica and titanium oxide are subject to surface treatment by a surface-treating agent to obtain hydrophobic silica and hydrophobic titanium oxide, which are preferable in terms of use.

The cleaning property improver is added to toner to remove a developing agent remaining on a photoconductor or a primary intermediate transfer element after transfer. Specific examples include, but are not limited to, zinc stearate, calcium stearate, aliphatic metal salts of stearic acid, and polymer particulates such as polymethyl methacrylate particulates and polystyrene particulates, which are prepared by a soap-free emulsion polymerization method. The polymer particulates preferably have a relatively narrow particle size distribution and the volume average particle diameter thereof is preferably from 0.01 to 1 µm.

There is no specific limit to the magnetic materials and it can be suitably selected from known magnetic materials to suit to a particular application. Specific examples include, but are not limited to iron powder, magnetite, and ferrite. Of these, white materials are preferable in terms of coloring.

Method of Manufacturing Toner

The method of manufacturing polymerization toner in the present disclosure includes a process of adjusting a solution or a liquid dispersion of toner material, a process of emulsification or dispersion, a process of removing organic solvents, and other optional processes.

In the present disclosure, the difference ($Dw1-Dw2$) between the weight average particle diameter $Dw1$ of toner immediately before completion of emulsification in the process of the emulsification and dispersion and the weight average particle diameter $Dw2$ of the toner obtained in the process of removing organic solvents is 1 µm or less and preferably 0.5 µm or less.

The weight average particle diameter $Dw1$ of toner immediately before completion of emulsification in the process of the emulsification and dispersion and the weight average particle diameter $Dw2$ ($Dw$ after preparation of toner) after the organic solvent is removed can be measured by sampling a minute amount thereof after the organic solvent is removed and diluting it with too excessive amount of deionized water.

The weight average particle diameter $Dw1$ of toner immediately before completion of emulsification can be measured by sampling a minute amount thereof under shearing and immediately diluting it with too excessive amount of deionized water to obtain the weight average particle diameter in emulsification receiving no impact of unification which occurs later.

The difference ($Dw1-Dw2$) indicates the degree of increase of the weight average particle diameter and if it surpasses 1 µm, crystalline polyester particulate may not be disposed on the surface of a toner particle.

Process of Adjusting Solution or Liquid Dispersion of Toner Material

The process of adjusting a solution or liquid dispersion of the toner material includes dissolving or dispersing toner material including at least a binder resin and a crystalline polyester resin liquid dispersion in an organic solvent to prepare a solution or a liquid dispersion of the toner material.

The toner material has no particular limit as long as it can form toner. The toner material can be suitably selected to suit to a particular application. For example, the toner material contains a binder resin or a compound including an active hydrogen group, a polymer (prepolymer) reactive with the compound including an active hydrogen group, a colorant, and the other optional components such as a releasing agent and a charge control agent. It is preferable to dissolve or disperse toner material and a liquid dispersion of crystalline polyester resin in an organic solvent to prepare the solution or the liquid dispersion of the toner material. Moreover, it is preferable to remove the organic solvent during or after granulation of toner.

Organic Solvent

There is no specific limit to the organic solvent in which the toner material is dissolved or dispersed as long as it can dissolve or disperse the toner material and the organic solvent can be suitably selected to suit to a particular application. In terms of easily removing the organic solvent during or after granulation of toner, it is suitable to select an organic solvent having a boiling point of lower than 150 degrees C.

Specific examples of such organic solvents include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, methyl isobutyl ketone, etc. In addition, ester-based solvents are preferable and ethyl acetate is particularly preferable. These can be used alone or in combination.

The proportion of the organic solvent has no particular limit and can be suitably selected to suit to a particular application. For example, the proportion is preferably from 40 to 300 parts by mass, more preferably from 60 to 140 parts by mass, and furthermore preferably from 80 to 120 parts by weight based on 100 parts by mass of toner material. The solution or the liquid dispersion of the toner material is prepared by dissolving in an organic solvent the toner material including a crystalline polyester resin liquid dispersion, a compound having an active hydrogen group, a polymer reactive with the compound having an active hydrogen group, a non-modified polyester resin, a releasing agent, a colorant, a charge control agent, etc. In the toner material, components other than the component except for the polymer reactive with the compound having an active hydrogen group can be admixed in an aqueous medium or added to the aqueous medium together with the solution or the liquid dispersion when the solution or the liquid dispersion of the toner material is added to the aqueous medium in the preparation of the aqueous medium, which is described later.

Process of Emulsification or Dispersion

The emulsification and dispersion process includes adding the solution or the liquid dispersion of the toner material to an aqueous medium for emulsification or dispersion to prepare an emulsion or a liquid dispersion.

Aqueous Medium

There is no specific limit to the aqueous medium and it can be suitably selected among known aqueous media.

Specific examples includes, but are not limited to, water, a solvent mixable with water, and a mixture thereof. Water is particularly preferable of these. The water-mixable solvent is not particularly limited as long as it is mixable with water.

Specific examples include, but are not limited to, alcohols, dimethylformamide, tetrahydrofuran, cellosolves, and lower ketones.

Specific examples of the alcohols include, but are not limited to, methanol, isopropanol, and ethylene glycol.

Specific examples of the lower ketones include, but are not limited to, acetone and methyl ethyl ketone. These can be used alone or in combination.

The aqueous medium is prepared by dispersing the resin particulates in the aqueous medium under the presence of an anionic surfactant. There is no specific limit to the addition amount of the anionic surfactant and the resin particulate to the aqueous medium and it can be suitably selected to suit to a particular application. For example, it is preferably from 0.5 to 10 percent by mass.

Emulsion or Dispersion

With regard to emulsification or dispersion of the solution or dispersion of toner material in an aqueous medium, it is preferable to conduct dispersion while stirring the solution or dispersion of toner material in the aqueous medium. There is no specific limit to the dispersion method and it can be suitably selected to suit to a particular application. For example, dispersion can be conducted by using a known dispersion device. Specific examples of the dispersion device include, but are not limited to, a low speed shearing type dispersion device and a high speed shearing type dispersion device. In this method of manufacturing toner, an attachable base material is produced during emulsification or dispersion when a compound having an active hydrogen group and a polymer reactive with the compound having an active hydrogen group are caused to conduct elongation reaction and cross linking reaction.

The particle diameter during emulsification is monitored and shearing conditions, the content of an anionic surfactant and resin particulate, and the addition amount of cationic component are adjusted to obtain a target emulsification particle diameter. The difference between the emulsification particle diameter and the particle diameter of the toner from which the solvent is measured. Thereafter, in order to reduce this difference, the shearing condition, the content of an anionic surfactant and resin particulate, and the addition amount of cationic component are adjusted.

As a consequence, crystalline polyester resin are uniformly disposed on the surface of the toner.

The urea-modified polyester mentioned above can be prepared by, for example, (1): emulsifying or dispersing a solution or liquid dispersion of toner material containing a polymer {for example, polyester prepolymer (A) having an isocyanate group} reactive with a compound having an active hydrogen group in an aqueous medium together with the compound having an active hydrogen group {for example, amine (B)} to form an oil phase and conducting elongation reaction or cross-linking reaction of the solution or liquid dispersion of toner material containing a polymer and the compound having an active hydrogen group in the aqueous medium, or (2): emulsifying or dispersing a solution or liquid dispersion of toner material in an aqueous medium to which a compound having an active hydrogen group is preliminarily added to form an oil phase followed by elongation reaction or cross-linking reaction of the solution or the liquid dispersion of toner material and the compound having an active hydrogen group in the aqueous medium. Alternatively, (3): admixing a solution or liquid dispersion of toner material in an aqueous medium and thereafter adding a compound having an active hydrogen group thereto to form an oil droplet followed by elongation reaction or cross-linking reaction of the solution or liquid dispersion of toner material and the compound having an active hydrogen group at the particle interface in the aqueous medium is also possible. In the case of (3), a modified polyester resin is preferentially produced on the surface of toner to be produced so that the toner particle can have a concentration gradient.

The reaction condition of forming a binder resin by emulsification and dispersion has no particular limit and can be suitably selected depending on the combination of the polymer having reactive with the compound having an active hydrogen group and the compound having an active hydrogen group. The reaction time is preferably from 10 minutes to 40 hours and more preferably from 2 to 24 hours.

A specific example of the method of stably forming a liquid dispersion containing a polymer reactive with an active hydrogen group {e.g., a polyester prepolymer (A) having an isocyanate group} in an aqueous medium includes a method in which a solution or liquid dispersion of toner material prepared by dissolving or dispersing in an organic solvent a toner material containing, for example, a compound having an active hydrogen group, a colorant, a release agent, a charge control agent, and a non-modified polyester resin, is added to an aqueous medium phase followed by dispersion utilizing a shearing force.

In the emulsification or the dispersion, the content of the aqueous medium is preferably from 50 to 2,000 parts by mass and more preferably from 100 to 1,000 parts by mass base on 100 parts by mass of the toner material. When the content is less than 50 parts by mass, dispersion state of toner material is not good so that toner having a target particle diameter may not be obtained. When the content is greater than 2,000 parts by mass, the production cost increases.

As the aqueous medium, in addition to the anionic surfactant and the resin particulate mentioned above, the following inorganic compound dispersant and polymeric protective colloid can be used in combination. An inorganic compound dispersant such as tricalcium phosphate, calcium phosphate, titanium oxide, colloidal silica, and hydroxyapatite can also be used as the inorganic compound dispersant hardly soluble in water.

Specific examples of the polymeric protective colloids include, but are not limited to, acids, (meth)acrylic monomer having a hydroxyl group, vinyl alcohol or ethers thereof, esters of vinyl alcohol and a compound having a carboxylic group, amide compounds or methylol compounds thereof, chlorides, homopolymers or copolymers having a nitrogen atom or a heterocyclic ring thereof, polyoxyethylene based compounds and celluloses.

Specific examples of the acids include, but are not limited to, acrylic acid, methacrylic acid, α-cyanoacrylic acid, α-cyanomethacrylic acid, itaconic acid, crotonic acid, fumaric acid, maleic acid and maleic anhydride.

Specific examples of (meth)acrylic monomers having a hydroxyl group include, but are not limited to, β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethyleneglycolmonoacrylate, diethyleneglycolmonomethacrylate, glycerinmonoacrylate, glycerinmonomethacrylate, N-methylol acryl amide, and N-methylol methacryl amide.

Specific examples of vinyl alcohols mentioned above or its ethers include vinyl methyl ether, vinyl ethyl ether, and vinyl propyl ether.

Specific examples of the esters mentioned above of vinyl alcohol and a compound having a carboxylic group include, but are not limited to, vinyl acetate, vinyl propionate and vinyl butyrate. Specific examples of the amide compounds mentioned above or their methylol compounds include, but are not limited to, acrylamide, methacrylamide, diacetone acrylamide acid, and methylol compounds thereof.

Specific examples of the chlorides mentioned above include, but are not limited to, acrylic acid chloride and methacrylic acid chloride. Specific examples of homopolymers or copolymers mentioned above having a nitrogen atom or a heterocyclic ring thereof include, but are not limited to, vinyl pyridine, vinyl pyrrolidone, vinyl imidazole and ethylene imine.

Specific examples of the polyoxyethylene mentioned above include, but are not limited to, polyoxyethylene, polyoxypropylene, polyoxyethylenealkyl amines, polyoxypropylenealkyl amines, polyoxyethylenealkyl amides, polyoxypropylenealkyl amides, polyoxyethylene nonylphenyl ethers, polyoxyethylene laurylphenyl ethers, polyoxyethylene stearylphenyl esters, and polyoxyethylene nonylphenyl esters.

Specific examples of the celluloses mentioned above include, but are not limited to, methyl cellulose, hydroxyethyl cellulose and hydroxypropyl cellulose.

In a case in which a dispersion stabilizer such as calcium phosphate soluble in an acid or alkali is used, after calcium phosphate is dissolved in an acid such as hydrochloric acid, the resultant is rinsed with water or decomposed by enzyme to remove calcium phosphate from particulates.

Process of Removing Organic Solvent

The process of removing organic solvent is to remove an organic solvent from the emulsion or liquid dispersion.

Removal of Organic Solvent

The organic solvent is removed from slurry emulsion obtained by the emulsification and the dispersion. The organic solvent is removed by, for example, (1): a method in which the entire reacting system is gradually heated to completely evaporate the organic solvent in oil droplets or (2): a method in which an emulsion dispersion is sprayed into a dried atmosphere to completely remove a non-water-soluble organic solvent in oil droplets to form toner particulates and evaporate and remove the aqueous dispersant therefrom. The toner particle is formed when the organic solvent is removed. The thus-formed toner particle is subject to rinsing, drying, etc. followed by optional classification. The classification can be conducted by removing particulate portions using a cyclone, a decanter, or a centrifugal. Classification can be conducted after the toner particles are obtained as powder after the drying.

If the thus-obtained toner particle is mixed with particles such as a colorant, a release agent, a charge control agent, etc. and thereafter a mechanical impact is applied to the toner particle, the particles such as a releasing agent can be prevented from being detached from the surface of the toner particles.

Specific examples of the method of applying such mechanical impact include, but are not limited to, methods in which an impact is applied to a mixture by using a blade rotating at a high speed, a method in which a mixture is put into a jet air to cause particles to collide with each other or complicated particles to collide against a suitable collision board. Specific examples of such mechanical impact applicators for use in this method include, but are not limited to, ONG MILL (manufactured by Hosokawa Micron Co., Ltd.), modified I TYPE MILL (manufactured by Nippon Pneumatic Mfg. Co., Ltd.) in which the pressure of pulverization air is reduced, HYBRIDIZATION SYSTEM (manufactured by Nara Machine Co., Ltd.), KRYPTRON SYSTEM (manufactured by Kawasaki Heavy Industries, Ltd.), automatic mortars, etc.

The toner mentioned above preferably has the following weight average particle diameter (Dw), ratio of the weight average particle diameter (Dw) to the number average particle diameter (Dn), average circularity, volume resistivity value, and BET specific surface area.

The toner preferably has a weight average particle diameter of from 1 to 6 μm and more preferably from 2 to 5 μm. When the weight average particle diameter is less than 1 μm, toner dust particle tends to be produced during primary transfer and secondary transfer. When the weight average particle diameter is greater than 6 μm, dot reproducibility becomes insufficient so that granularity at half tone portions deteriorate, thereby failing to obtain high quality images.

The ratio (Dw/Dn) of the weight average particle diameter (Dw) and the number average particle diameter (Dn) is preferably 1.25 or less and more preferably from 1.05 to 1.25.

When the ratio (Dw/Dn) of the weight average particle diameter (Dw) and the number average particle diameter (Dn) is less than 1.05, toner for use in a two-component developing agent containing the toner and carriers is easily caused to cohere to the surface of the carriers during agitation in a developing unit for an extended period of time, which may lead to deterioration of the chargeability and cleaning performance. In addition, in the case of a single component developing agent containing the toner, filming of the toner to a developing roller and cohesion of the toner to a part, for example, a blade to regulate the thickness of the toner layer, may occur. When the ratio (Dw/Dn) is greater than 1.25, obtaining quality images with a high definition is difficult and when the toner contained in the developing agent is replenished, the particle diameter of the toner may markedly vary. On the other hand, if the ratio (Dw/Dn) of the weight average particle diameter to the number average particle diameter is reduced, the distribution of the size of the charge becomes uniform so that background fouling can be suppressed. When the ratio (Dw/Dn) of the weight average particle diameter to the number average particle diameter is greater than 1.25, the distribution of the size of the charge of toner becomes not sharp so that it is difficult to obtain high definition images.

In addition, the ratio (Dw/Dn) of the weight average particle diameter to the number average particle diameter is from 1.05 to 1.25, obtained toner tends to have excellent storage stability, low temperature fixability, and hot offset resistance. In particular, when the toner is used for a full color photocopier, image gloss ameliorates.

In addition, when a two-component developing agent is used and the toner is replenished for a long period of time, the variation of the particle diameter of the toner is small. Also, developability is good and stable when the developing agent is stirred in a developing device for a long period of time. In the case of a single-component developing agent, if the toner is replenished for a long period of time, the variation of the particle diameter of the toner is reduced and filming of the toner on the developing roller and fusion adhesion of the toner onto members such as a blade to regulate the thickness of the toner layer, so that good and stable developability is sustained even when the developing agent is stirred for an extended period of time. Thus, quality images can be produced.

The weight average particle diameter (Dw) and the number average particle diameter (Dn) were measured by using a particle size measuring instrument (MULTISIZER III, manufactured by BECKMAN COULTER INC.) with an aperture diameter of 100 μm and the measuring results were analyzed by an analysis software (BECKMAN COULTER MULTISIZER 3 VERSION 3.51). To be specific, 0.5 ml of 10% by weight surfactant (alkylbenzene sulfonate, NEOGEN SC-A, manufactured by Daiichi Kogyo Co., Ltd.) is placed in a glass beaker (100 ml).

0.5 g of each toner was added in the beaker and stirred by a microspatula. 80 ml of deionized water was added to the mixture. The thus-obtained liquid dispersion was subject to dispersion treatment for ten minutes by an ultrasonic wave dispersion device (W-113MK-II, manufactured by Honda Electronics). The liquid dispersion was measured by using the MULTISIZER III using ISOTON® III (manufactured by BECKMAN COULTER INC.) as the measuring solution. The liquid dispersion was dripped such that the concentration indicated by the measuring device was from 6 to 10%. In this measuring method, it is suitable to keep the concentration in the range mentioned above in terms of reproduction of measuring the particle diameter. The measured particle diameter can be obtained without an error when the concentration is within that range.

Average Circularity

The toner preferably has an average circularity of from 0.950 to 0.990. When the average circularity is less than 0.950, image uniformity during development tends to deteriorate. The ratio of toner transfer from a photoconductor to an intermediate transfer body or from an intermediate transfer body to a recording medium decreases, so that transfer is not uniformly conducted. In addition, the toner of the present disclosure is manufactured by emulsification treatment in an aqueous medium. In particular, this is suitable to reduce the particle diameter of color toner and obtain toner having an average circularity in the range specified above.

The average circularity of the toner is defined as follows:
Average circularity SR=(perimeter of circle having same area as that of projected image of particle)/(perimeter of projected image of particle)×100 percent. The average circularity was measured using a flow type particle image analyzer (FPIA-2100, manufactured by Sysmex Corporation) and analyzed utilizing an analysis software (FPIA-2100 Data Processing Program for FPIA version 00-10). To be specific, 0.1 ml to 0.5 ml of 10 percent by mass surfactant (alkylbenzene sulfonate, NEOGEN SC-A, manufactured by Daiichi Kogyo Co., Ltd.) was placed in a glass beaker (100 ml). 0.1 to 0.5 g of each toner was added in the beaker and stirred by a microspatula. 80 ml of deionized water was added to the mixture. The thus-obtained liquid dispersion was subject to dispersion treatment for three minutes utilizing an ultrasonic wave dispersion device (manufactured by Honda Electronics). The toner form and distribution were measured for the liquid dispersion using FPIA-2100 until the concentration became 5,000 to 15,000 particles/μl. In this measuring method, it is suitable to make the concentration of the liquid dispersion in the range of from 5,000 to 15,000 particles/μl in terms of reproduction of measuring the average circularity. To obtain the concentration of the liquid dispersion mentioned above, it is required to change the condition of the liquid dispersion, that is, the amount of the surfactant to be added and the amount of toner. The required amount of the surfactant varies depending on the hydrophobicity of the toner as in the measuring of the toner particle diameter. If an excessively large amount is added, the noise tends to occur due to bubbles. If an excessively small amount is added, the toner tends to be insufficiently wet, resulting in insufficient dispersion. In addition, the addition amount of the toner depends on the particle diameter. In a case of a small particle diameter, the amount tends to be small and, a large particle diameter, large. When the toner particle diameter is from 3 to 7 μm, the addition amount of the toner is 0.1 to 0.5 g, thereby adjusting the concentration of the liquid dispersion to be 5,000 to 15,000 particles/μl.

Volume Resistivity Value of Toner

Common logarithm value log ρ (Ωcm) of the volume resistivity value of the toner is preferably from 10.9 to 11.4 Log Ωcm.

According to this, dispersion state of colorants, etc. in toner becomes good and good charging stability is obtained so that toner scattering and fogging can be prevented. When Log ρ of toner is less than 10.9 Log Ωcm, electroconductivity becomes high. This causes poor charging, thereby increasing background and toner scattering. In addition, defective images ascribable to electrostatic offset, etc., occur, so that images of high quality cannot stably obtained. In addition, when Log ρ of toner is greater than 11.4 Log Ωcm, the resistance value increases so that the charging size increases, which may lead to a decrease in image density.

BET Specific Surface Area of Toner

The toner preferably has a BET specific surface area of from 0.5 to 4.0 $m^2/g$ and more preferably from 0.5 to 2.0 $m^2/g$. When the specific surface area is less than 0.5 $m^2/g$, the surface of the toner is densely covered with the resin particulate, which inhibits adhesion between the binder resin component inside the toner and a fixing sheet. As a consequence, the temperature of the lower limit of fixing increases. In addition, the resin particulate prevents oozing of wax, thereby preventing the wax from demonstrating releasing performance. As a result, offset tends to occur. Conversely, when the BET specific surface area is greater than 4.0 $m^2/g$, organic particulates remaining on the surface of the toner greatly extrude as a convex part or resin particulates in coarse state remain as multiple layers, which inhibits adhesion between the binder resin component inside the toner and a fixing sheet. As a consequence, the temperature of the lower limit of fixing increases. In addition, the resin particulate prevents oozing of wax, thereby preventing the wax from demonstrating releasing performance. As a result, offset tends to occur. In addition, additives tends to surface and roughens the surface of the toner, which has an adverse impact on image quality.

There is no specific limit to the color of the colorant for use in the toner of the present disclosure. One or more can be selected from black toner, cyan toner, magenta toner, and yellow toner and various kinds of colors can be suitably obtained by selecting the colorant. Color toner is preferable.

Developing Agent

The developing agent of the present disclosure contains the toner of the present disclosure and other suitably selected components such as carriers. The developing agent can be a one-component developing agent and a two-component developing agent and the two-component developing agent is preferable in terms of length of the working life particularly when used in a high performance printer that meets the demand for high speed information processing of late.

In a case of a one-component developing agent using the toner described above, even when the toner is replenished, the change in the particle diameter of the toner is small, no filming of the toner on the developing roller serving as the developing agent bearing member occurs, and no fusion bonding of the toner onto members such as a blade to regulate the thickness of the toner layer occurs. Therefore, good and stable developability is sustained to produce quality images even when the developing agent is used (stirred) in a developing device for an extended period of time. In a case of a two-component developing agent using the toner described above, even when the toner is replenished for an extended period of time, the change in the particle diameter of the toner in the developing agent is small. In addition, good and stable developability is sustained even when the developing agent is stirred in a development device for an extended period of time.

Carrier

There is no specific limitation to the carrier and it can be suitably selected to suit to a particular application. It is preferable to use carrier containing a core material and a resin layer with which the core material is covered.

There is no specific limitation to the material for the core material and any known material can be suitably selected to suit to a particular application. For example, manganese-strontium (Mn—Sr) based material and manganese-magnesium (Mn—Mg) based material having 50 to 90 emu/g are preferable. To secure image density, highly magnetized material such as iron powder having 100 emu/g or more and magnetite having 75 to 125 emu/g is preferable. In addition, weakly magnetized copper-zinc (Cu—Zn) based material having 30 to 80 emu/g is preferable in terms of reducing the impact of the contact between the toner filaments formed on the development roller and the image bearing member, which is advantageous in improvement of the image quality. These can be used alone or in combination.

There is no specific limit to the selection of the material for the resin layer mentioned above and any known resin can be suitably selected to suit to a particular application.

Specific examples include, but are not limited to, amino-based resins, polyvinyl-based resins, polystyrene-based resins, polycarbonate-based resins, polyethylene resins, polyvinyl fluoride resins, polyvinylidene fluoride resins, polytrifluoroethylene resins, polyhexafluoropropylene resins, copolymers of vinylidene fluoride and acrylate monomer, copolymers of vinylidene fluoride and vinyl fluoride, fluoroterpolymers such as terpolymers of tetrafluoroethylene, fluorovinylidene, and monomer including no fluorine atom, and silicone resins. These can be used alone or in combination. Of these, silicone resins are particularly preferable.

There is no specific limitation to the silicone resins and any known silicone resins are suitably selected to suit to a particular application.

Specific examples include, but are not limited to, straight silicone resins formed of only organosiloxane bond; and silicone resins modified by alkyd resins, polyester resins, epoxy resins, acrylic resins, urethane resins, etc.

The silicone resins are available on the market.

Specific examples of the straight silicone resin include, but are not limited to, KR271, KR255, and KR152, manufactured by Shin-Etsu Chemical Co., Ltd.; and SR2400, SR2406, and SR2410, manufactured by DOW CORNING TORAY CO., LTD.

The modified silicone resins are available on the market.

Specific examples include, but are not limited to, KR206 (alkyd-modified), KR5208 (acrylic-modified), ES1001N (epoxy-modified), and KR305 (urethane-modified) manufactured by Shin-Etsu Chemical Co., Ltd.; and SR2115 (epoxy-modified), and SR2110 (alkyd-modified), manufactured by DOW CORNING TORAY CO., LTD.

It is possible to use a silicone resin alone. Also, it is possible to use it with a cross-linkable component, a charge size control component, etc. simultaneously.

The resin layer may contain electroconductive powder such as metal powder, carbon black, titanium oxide, tin oxide, and zinc oxide. The average particle diameter of such electroconductive powder is preferably not greater than 1 μm. When the average particle diameter is greater than 1 μm, controlling the electric resistance may become difficult.

The resin layer described above can be formed by, for example, dissolving the silicone resin described above, etc. in a solvent to prepare a liquid application and applying the liquid application to the surface of the core material described above by a known application method followed by drying and baking.

Specific examples of the known application methods include, but are not limited to, a dip coating method, a spray coating method, and a brushing method.

There is no specific limitation to the solvent and it can be suitably selected to suit to a particular application.

Specific examples include, but are not limited to, toluene, xylene, methylethylketone, methylisobutyll ketone, cellosolve, and butylacetate.

There is no specific limitation to the baking. An external heating system or an internal heating system can be used. For example, a fixed electric furnace, a fluid electric furnace, a rotary electric furnace, a method of using a burner furnace, and a method of using a microwave can be suitably used.

The content of the carrier in the resin layer is preferably from 0.01 to 5.0 percent by mass. When the content is less than 0.01 percent by mass, it is difficult in some cases to form a uniform layer on the surface of the core material. When the content is greater than 5.0 percent by mass, the resin layer may become excessively thick, thereby causing granulation between carrier particles so that uniform carrier particles are not obtained.

When the developing agent described above is a two component developing agent, there is no specific limitation to the content of the carrier in the two component developing agent. For example, the content is preferably from 90 to 98 percent by mass and more preferably from 93 to 97 percent by mass.

In general, the mixing ratio of the toner to the carrier in the two component developing agent is preferably from 1 to 10.0 parts by mass based on 100 parts by mass of the carrier.

The carrier preferably has a weight average particle diameter Dw of from 15 to 40 μm. When the weight average particle diameter is less than 15 μm, carrier is transferred together in the transfer process (carrier attachment) tends to occur. When the weight average particle diameter is greater than 40 μm, carrier attachment is prevented. However, background fouling may easily occur when toner concentration is increased to obtain high density images. In addition, when the dot diameter of a latent image is small, reproducibility of the dot varies, which may cause granularity of high-lighted portion to deteriorate The weight average particle diameter Dw of the carrier is calculated based on the particle size distribution (relation between frequency of the number of particles and particle diameter) measured based on the number of particles. The weight average particle diameter Dw is represented by the following relation (A).

$$Dw=\{1/\Sigma(nD^3)\}\times\{\Sigma(nD^4)\} \qquad \text{Relation (A)}$$

In the relation (A), D represents a representative particle diameter (μm) of particles present in each channel and n represents the total number of particles present in each channel.

The channel means a length by which the particle diameter range in the particle size distribution chart is equally divided. In the present disclosure, the length is 2 μm. In addition, the lower limit of the particle diameter of particles stored for each channel is adopted as the representative particle diameter.

In addition, the number average particle diameter Dp of the carrier and the core particle of the carrier is calculated based on the particle size distribution of the particle measured based on the number of particles. The number average particle diameter Dp is represented by the following relation (B).

$$Dp=(1/\Sigma N)\times(\Sigma nD) \qquad \text{Relation (B)}$$

In the relation (B), N represents the total number of particles measured, n represents the total number of particles present in each channel, and D represents the lower limit of the particle diameter of particles stores in each channel (2 μm).

The particle size distribution can be measured by a particle size analyzer such as a microtrac particle size analyzer (model HRA 9320-X100, manufactured by Honewell). The measuring conditions are as follows.

1: Particle diameter range: 8 to 100 μm
2: Length of channel (Channel width): 2 μm
3: Number of channels: 46
4: Refractive index: 2.42

Structure of Photoconductor

The image forming apparatus of the present disclosure includes a photoconductor having a particular photosensitive layer on an electroconductive substrate.

The photoconductor in the present disclosure is described in detail below.

Electroconductive Substrate

The electroconductive substrate can be formed by using material having a volume resistance of not greater than $10^{10}$ Ω·cm. For example, it is possible to use plastic or paper having a film-like form or cylindrical form covered with metal such as aluminum, nickel, chrome, nichrome, copper, silver, gold, platinum, and iron, or a metal oxide such as tin oxide and indium oxide by depositing or sputtering. Also, a board made of aluminum, an aluminum alloy, nickel, and a stainless metal can be used. Furthermore, it is also possible to use a tube which is manufactured from the board mentioned above by a crafting technique such as Drawing Ironing method, Impact Ironing method, Extruded Ironing method, and Extruded Drawing method, and cutting and slicing method followed by surface-treatment such as cutting, super finishing, and polishing.

Intermediate Layer

The photoconductor of the present disclosure may further include an intermediate layer disposed between the electroconductive substrate and the photosensitive layer. The intermediate layer is disposed in order to enhance adhesion property, prevent occurrence of moire, improve applicability of the layer disposed above, and prevent charge infusion from the electroconductive substrate.

Normally, the intermediate layer is mainly formed of a resin. Normally, the photosensitive layer is applied to the intermediate layer. Therefore, a thermally curable resin poorly soluble in an organic solvent is preferable as the resin for use in the intermediate layer. In particular, polyurethane, melamine resins, and alkyd-melamine resins are particularly preferable because these sufficiently satisfy such a purpose. The resins can be suitably diluted using a solvent such as tetrahydrofuran, cyclohexanone, dioxane, dichloroethane, and butanone to obtain a paint (liquid application). In addition, it is suitable to add particulates of metal or metal oxide to the intermediate layer in order to control electroconductivity and prevent occurrence of moire. In particular, titanium oxide and zinc oxide are preferably used.

The particulate can be dispersed in a solvent such as tetrahydrofuran, cyclohexanone, dioxane, cycloethane, and butanone using a ball mill, attritor, sand mill, etc., to obtain a paint mixture (liquid application) of the liquid dispersion and the resin component.

The paint is applied to the electroconductive substrate by a dip coating method, a spray-coating method, and bead coating method to form the intermediate layer. If desired, the paint on the electroconductive substrate is cured by heating. The suitable thickness of the intermediate layer is from about 2 to about 20 μm in most cases. If accumulation of the residual potential of a photoconductor increases, it is preferable to make the thickness less than 3 μm.

Photosensitive Layer

The photosensitive layer of the photoconductor is a laminate photosensitive layer in which a charge generating layer and a charge transport layer are sequentially laminated.

Charge Generating Layer

The charge generating layer is a part of the laminate photosensitive layer and generates charges upon application of light. This layer is mainly composed of charge generating material. The charge generating layer may optionally contain a binder resin. Inorganic material and organic material can be used as the charge generating material.

Specific examples of the inorganic material include, but are not limited to, crystal selenium, amorphous-selenium, selenium-tellurium-halogen, selenium-arsenic compounds, and amorphous-silicon. With regard to the amorphous-silicon, those in which a dangling-bond is terminated with a hydrogen atom or a halogen atom or those in which boron atoms or phosphorous atoms are doped are preferably used.

Known material can be the organic material.

Specific examples include, but are not limited to, metal phthalocyanine such as titanyl phthalocyanine and chlorogallium phthalocyanine, metal-free phthalocyanine, azulenium salt pigment, squaric acid methine pigment, symmetric or asymmetric azo pigments having a carbazole backbone, symmetric or asymmetric azo pigments having a triphenyl amine backbone, symmetric or asymmetric azo pigments having a fluorenone backbone, and perylene-based pigments. Of these, metal phthalocyanine, symmetric or asymmetric azo pigments having a triphenyl amine backbone, symmetric or asymmetric azo pigments having a fluorenone backbone, and perylene-based pigments are preferable because those have high quantum efficiency of charge generation. These charge generating materials can be used alone or as a mixture in combination.

Specific examples of the binder resin optionally used in the charge generating layer include, but are not limited to, polyamides, polyurethanes, epoxy resins, polyketones, polycarbonates, polyarylate, silicone resins, acrylic resins, polyvinylbutyrals, polyvinylformals, polyvinylketones, polystyrenes, poly-N-vinylcarbazoles, and polyacrylamides. In addition, it is suitable to use a charge transport polymer, which is described later. Of these, polyvinyl butyral is used in many cases. These binder resins can be used alone or as a mixture of two or more.

The methods of forming the charge generating layer is largely typified into vacuum thin layer forming methods and casting methods from a solution dispersion system.

Specific examples of the vacuum thin layer forming methods include, but are not limited to, a vacuum evaporation method, a glow discharge decomposition method, an ion-plating method, a sputtering method, a reactive sputtering method, or a chemical vapor deposition (CVD) method. The inorganic material and organic material specified above are used to form a suitable charge generating layer by those methods.

In addition, to provide the charge generating layer according to the casting method, the above-mentioned inorganic or organic charge generating material is dispersed with an optional binder resin in a solvent, for example, tetrahydrofuran, cyclohexanone, dioxane, cycloroethane, and butanone, using, for example, a ball mill, an attritor, and a sand mill. Thereafter, the thus-obtained liquid dispersion is suitably diluted and applied. Of these solvents, methylethyl ketone, tetrahydrofuran, and cyclohexanone are preferable to chlorobenzene, dichlorormethane, toluene, and xylene in terms of the degree of burden on the environment. A dip coating method, a spray coating method, a bead coating method, etc. can be used for application.

A suitable thickness of the thus-obtained charge generating layer is from about 0.01 to about 5 µm.

To reduce the residual potential and enhance sensitivity, it is suitable to thicken the charge generating layer in most case. On the other hand, such a thick layer may degrade chargeability such as retention of charges and formation of space charges in many cases. Therefore, considering this trade-off, a preferable thickness of the charge generating layer is from 0.05 to 2 µm.

In addition, a leveling agent and a compound having a low molecular weight such as an antioxidant, a plasticizer, a lubricant, and an ultraviolet ray absorbent can be optionally added to the charge generating layer. These compounds can be used alone or as a mixture thereof. A combinational use of the compound having a low molecular weight and the leveling agent degrades sensitivity in many cases. Accordingly, the content of such a compound is generally from 0.1 to 20 phr and preferably from 0.1 to 10 phr. A suitable content of the leveling agent is from about 0.001 to 0.1 phr.

Charge Transport Layer

The charge transport layer is part of a laminate type photosensitive layer in charge of infusing and transporting the charges generated in the charge generating layer and neutralizing the surface charge of the photoconductor generated during the charging. The charge transport layer is mainly formed of a charge transport component and a binder component to bind the charge transport component.

Examples of material usable as the charge transport material are charge transport material, a hole transport material, and a charge transport polymer, each of which has a low molecular weight.

Specific examples of the charge transport material include, but are not limited to, electron accepting material such as asymmetric diphenoquinone derivative, a fluorenone derivative, and a naphthal imide derivative. These charge transport materials can be used alone or in combination.

The following electron donating material can be suitably used as the hole transport material.

Specific examples include, but are not limited to, oxazole derivatives, oxadiazole derivatives, imidazole derivatives, triphenyl amine derivatives, butadiene derivatives, 9-(p-diethylaminostyryl anthracene), 1,1-bis-(4-dibenzyl aminophenyl)propane, styrylanthracene, styrylpyrazoline, phenylhydrazones, α-phenylstilbene derivatives, thiazole derivatives, triazole derivatives, phenazine derivatives, acridine derivatives, benzfuran derivatives, benzimidazole derivatives, and thiophen derivatives. These positive hole transport materials can be used alone or in combination.

In addition, it is also suitable to use the following charge transport polymers. For example, polymers having a carbazole ring such as poly-N-vinylcarbazole, polymers having a hydrazone structure disclosed in Japanese Unexamined Patent Application Publication No. 557-78402, polysilylene polymers disclosed in Japanese Unexamined Patent Application Publication No. S63-285552, and aromatic polycarbonates illustrated by Chemical formula 1 to Chemical formula 6 disclosed in Japanese Unexamined Patent Application Publication No. 2001-330973. These charge transport materials can be used alone or in combination. The illustrated compounds disclosed in Japanese Unexamined Patent Application Publication No. 2001-330973 are preferable in terms of the power of electrostatic properties.

In comparison with a charge transport material of a low molecular weight type, the charge transport polymer is suitable to prevent poor curing of a cross-linked surface layer because the component constituting a charge transport layer little elutes to the cross-linked surface layer when laminating the cross-linked surface layer onto the charge transport layer. In addition, due to the increase of the molecular weight of the charge transport material, the charge transport material has good heat resistance. This is advantageous to prevent deterioration ascribable to the heat generated during curing when forming the cross-linked surface layer.

Examples of the polymer usable as the binder component of the charge transport layer are thermoplastic resins or thermocurable resins such as polystyrene, polyester, polyvinyl, polyarylate, polycarbonate, acrylic resins, silicone resins, fluorochemical resins, epoxy resins, melamine resins, urethane resins, phenol resins, and alkyd resins. Of these, polystyrene, polyester, polyarylate, and polycarbonate demonstrate good charge mobility if those are used as the binder component of the charge transport component. In addition, since a layer, preferably a cross-linked surface layer, is formed on the charge transport layer, the charge transport layer does not need to have a mechanical strength required for a typical charge transport layer. Therefore, transparent material such as polystyrene having weak mechanical strength in some degree and not suitable in typical technologies can be used as the binder component of the charge transport layer.

These compounds can be used alone or in combination. It also can be used as copolymer composed of two or more kinds of raw material monomers. Moreover, the compound can be copolymerized with a charge transport material.

When using an electrically inert polymer to reform the charge transport layer, it is suitable to use polyester of cardo type polymer having a bulky backbone such as fluorene, polyester such as polyethylene terephthalate and polyethylene naphthalate, polycarbonate in which 3,3' site of the phenol component is alkyl-substituted for a bisphenol type polycarbonate such as C type polycarbonate, polycarbonate in which geminalmethyl group in bisphenol A is substituted with an alkyl group having a long chain having two or more carbon atoms, polycarbonate having a biphenyl or biphenyl ether backbone, polycaprolactone, polycarbonate having a long chain alkyl backbone such as polycaprolactone (for example, disclosed in Japanese Unexamined Patent Application Publication No. H07-292095), acrylic resins, polystyrene, and hydrogenated butadiene.

The electrically inert polymer does not include a chemical structure demonstrating a photoconductivity such as triarylamine structure. When these resins are used as an additive agent in combination with a binder resin, the content of the resin is preferably 50 percent by mass or less to all the solid portion of the charge transport layer.

When the charge transport material of a low molecular weight type is used, the content is normally from about 40 to about 200 phr and preferably from about 70 to about 100 phr. In addition, when the charge transport polymer is used, it is preferable to use material obtained by copolymerization of a charge transport component and a resin component with a ratio of 100 parts by mass of the charge transport component to 0 to about 200 parts by mass and preferably from about 80 to about 150 parts of the resin component.

To satisfy high level of sensitization, it is preferable that the content of the charge transport component be 70 phr or more. In addition, as the charge transport material, monomers or dimers of α-phenyl stilbene compound, bendizine compound, and butadiene compound or charge transport polymers having such a structure in the main chain or side chain are preferable because most thereof have a good charge mobility.

To form the charge transport layer, a mixture of a copolymer mainly composed of a charge transport component and a binder component is dissolved or dispersed in a suitable solvent to prepare and apply a paint (liquid application) for charge transport layer followed by drying. As the application method, a dip coating method, a spray coating method, a ring coating method, a roll coater method, a gravure coating method, a nozzle coating method, and a screen printing method are employed.

Specific examples of the dispersion solvent usable during preparation of the paint for charge transport layer include, but are not limited to, ketones such as methylethyl ketone, acetone, methyl isobutyl ketone, and cyclohexanone, aromatic compounds such as dioxane, tetrahydrofuran, and ethylcellosolve, halogens such as chlorobenzene and dichloromethane, and esters such as ethylacetate, and butyl acetate. Of these solvents, methylethyl ketone, tetrahydrofuran, and cyclohexanone are preferable to chlorobenzene, dichlorormethane, toluene, and xylene in terms of the degree of burden on the environment. These solvents can be used alone or as a mixture thereof.

Normally, a cross-linked surface layer is laminated on the charge transport layer. This obviates the need for designing thickening of the charge transport layer to deal with layer scraping during actual use. It is suitable that the charge transport layer has a thickness of from about 10 to about 40 µm and preferably from about 15 to about 30 µm to secure required sensitivity and charging power.

In addition, a leveling agent and a compound having a low molecular weight such as an antioxidant, a plasticizer, a lubricant, and an ultra violet ray absorbing agent can be optionally added to the charge transport layer. These compounds can be used alone or as a mixture thereof. A combinational use of the compound having a low molecular weight and the leveling agent degrades sensitivity in many cases. Accordingly, the content of such a compound is generally from 0.1 to 20 phr and preferably from 0.1 to 10 phr. A suitable content of the leveling agent is from about 0.001 to 0.1 phr.

Surface Layer

A cross-linked surface layer is preferable as the surface layer.

The cross-linked surface layer is a protective layer formed on the surface of a photoconductor. Regarding this protective layer, after a paint is coated, a resin having a cross-linking structure is formed by polymerization reaction of radical polymerizable material component. Since the resin layer has the cross-linking structure, the cross-linked surface layer has the highest abrasion resistance of the layers of the photoconductor. Also, if the cross-linked charge transport structure unit is contained in the cross-linked surface layer, it has a charge transport property similar to that of the charge transport layer.

Radical Polymerizable Material Component

As the radical polymerizable material component, for example, acrylate having an acryloyloxy group is usable.

In the present disclosure, trimethylol propane can be suitably used because it is excellent to enhance abrasion resistance of the surface of a photoconductor.

Caprolactone modified dipentaerythritol hexaacrylate and dipentaerythritol hexaacrylate are preferable as a tri- or higher functional binder component. This makes it possible to improve abrasion resistance of the cross-linked layer and enhance strength thereof.

As the tri- or higher functional polymerizable monomer having no charge transport structure, for example, trimethylol propane triacrylate, caprolactone-modified dipentaerythritol hexaacrylate, and dipentaerythritol hexaacrylate are preferable.

Examples are articles manufactured by a reagent manufacturer such as TOKYO CHEMICAL INDUSTRY CO., LTD, and KAYARAD DPCA series and KAYARAD DPHA series manufactured by Nippon Kayaku Co., Ltd.

In addition, in order to promote and stabilize curing, it is possible to add an initiator such as IRGACURE® 184 (manufactured by Ciba Specialty Chemicals) in an amount of from about 5 to about 10 percent by mass to the total of solid portion.

Examples of the cross-linkable charge transport material include a chain-polymerized compound having an acryloyloxy group and a styrene group and a sequentially-polymerized compound. A compound having a charge transport structure and one or more (meth)acryloyloxy groups is usable.

In addition, the cross-linked surface layer may take a composition structure combined with a monomer or oligomer having one or more (meth)acryloyloxy with no charge transport structure.

For example, a liquid application (paint) containing at least such a compound is applied to form a layer and energy such as heat, light, electron beams, radioactive rays such as γ rays, is applied to the layer to cross-link and cure it to form the cross-linked surface layer.

An example of the compound having one or more (meth) acryloyloxy group and a charge transport structure is a charge transport compound represented by the Chemical formula 1, shown below.

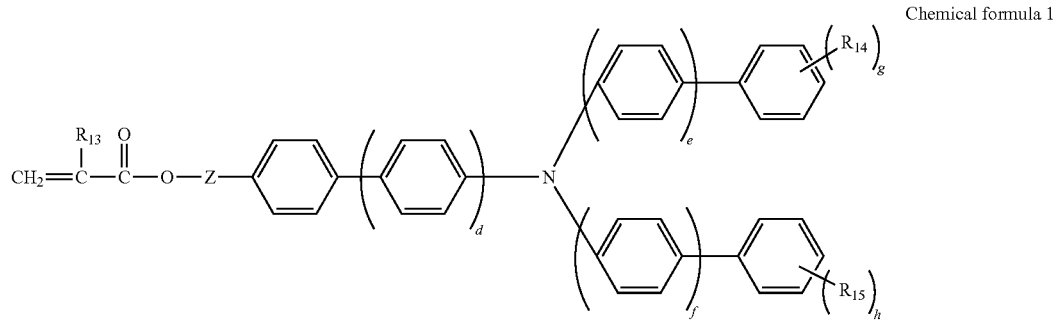

Chemical formula 1

In the Chemical formula l, d, e, and f each independently represent 0 or 1. $R_{13}$ represents a hydrogen atom or a methyl group. $R_{14}$ and $R_{15}$ independently represent a substitution group alkyl groups having one to six carbon atoms (excluding hydrogen atoms). g and h each independently represent 0 or integers of from 1 to 3. Z represents a single bond, a methylene group, an ethylene group, and a group represented by the following Chemical formulae 2 to 4.

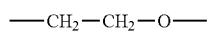

Chemical formula 2

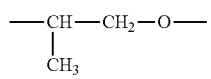

Chemical Formula 3

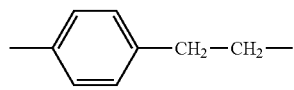

Chemical Formula 4

The cross-linked surface layer can be formed by, for examples, applying the radical polymerizable material component mentioned above and a paint for the cross-linked surface layer containing a solvent, etc.

The solvent used to prepare a paint (liquid application) of cross-linked surface layer preferably dissolves a monomer sufficiently.

Specific examples include, but are not limited to, ethers, aromatic compounds, halogens, and esters, cellosolves such as ethoxyethanol and propylene glycols such as 1-methoxy-2-propanol. Of these, methylethyl ketone, tetrahydrofuran, cyclohexanone, and 1-methoxy-2-propanol are preferable because these are less burden to the environment than chlorobenzene, dichlorormethane, toluene, and xylene. These solvents can be used alone or as a mixture thereof.

As the method of applying the paint for the cross-linked surface layer, a dip coating method, a spray coating method, a ring coating method, a roll coater method, a gravure coating method, a nozzle coating method, and a screen printing method can be utilized. In many cases, the liquid application does not have a long pot life so that methods using small but sufficient amounts of liquid applications are advantageous in terms of the burden on the environment and economy. Of these, the spray coating method and the ring coating methods are preferable.

When forming the cross-linked surface layer, ultraviolet ray irradiation light source such as a high pressure mercury lamp and a metal halide lamp that mainly emit light having a wavelength in ultraviolet rays can be utilized. In addition, a visible light source can be selected according to the absorption wavelength of a radical polymerizable compound and a photopolymerization initiator. The irradiation light amount is preferably from 50 to 1,000 mW/cm². When the irradiation light amount is less than 50 mW/cm², it takes a long time to complete the curing reaction. When the irradiation light amount is greater than 1,000 mW/cm², curing reaction does not uniformly proceed, which causes local wrinkling on the surface of the cross-linked surface layer and greatly increases the number of non-reacted residual groups and reaction terminated ends. In addition, rapid cross-linking increases the internal stress, which leads to cracking and peeling-off of the layer.

In addition, a leveling agent, a compound having a low molecular weight such as an antioxidant, a plasticizer, a lubricant, and an ultraviolet ray absorbent, and the polymer mentioned in the description of the charge transport layer can be optionally added to the cross-linked surface layer. These compounds can be used alone or as a mixture thereof. A combinational use of the compound having a low molecular weight and the leveling agent degrades sensitivity in many cases. Accordingly, the content of such a compound is generally from 0.1 to 20 percent by mass and preferably from 0.1 to 10 percent by mass to the total solid portion in the paint. A suitable content of the leveling agent is from about 0.1 to about 5 percent by mass thereto.

The suitable thickness of the cross-linked surface layer is from about 3 to about 15 μm. The lower limit is the value calculated taking it account the degree of effect to the cost of forming a layer and the upper limit is set in terms of electrostatic property such as charging stability and light decay sensitivity and uniformity of layer quality.

Simulation according to molecular orbital calculation is rational to design material for a photoconductor and material for toner to satisfy the relation of the ionization potential of the present disclosure. The material is narrowed down based on the calculation result and a suitable combination is selected to demonstrate the effect of the present disclosure.

A specific calculation example of the material for a photoconductor is disclosed in, for example, the calculation example by Obata, etc. (Obata, etc., SHARP TECHNICAL JOURNAL, 76 (2004), refer to 36) and a specific calculation example of the material for toner is disclosed in, for example, the calculation example by Tanaka (Tanaka, DENSHI SHASHIN GAKKAISHI, 34 (1995), 118). Suitable material can be combined in a similar manner in the present disclosure.

Configuration of Image Forming Apparatus

Next, an embodiment to enforce the image forming method of the present disclosure by the image forming apparatus of the present disclosure is described with reference to the accompanying drawings.

An image forming apparatus 100 employing a tandem method illustrated in FIGS. 2 and 3 can be used.

In FIG. 2, the image forming apparatus 100 is mainly constituted of an image writing unit (120Bk, 120C, 120M, and 120Y), an image forming unit (130Bk, 139C, 130M, and 130Y), and a paper feeding unit 140 to form color images by electrophotography. Image data is subject to image processing at an image processing unit and converted into signals of each color of black (Bk), cyan (C), magenta (M), and Y (Yellow) for image formation. The signal is transmitted to the image writing unit (120Bk, 120C, 120M, and 120Y). The image writing unit (120Bk, 120C, 120M, and 120Y) is, for example, a laser scanning optical system composed of a laser light source, a polariscope such as rotational polygon mirror, a scanning imaging optical system, and a group of mirrors with four writing light paths corresponding to the signals for each color to write images according to the signals for each color onto the image forming unit (130Bk, 139C, 130M, and 130Y).

The image forming unit (130Bk, 139C, 130M, and 130Y) includes photoconductors (210Bk, 210C, 210M, and 210Y) for black, cyan, magenta, and yellow. Each of the photoconductors (210Bk, 210C, 210M, and 210Y) is normally an organic photoconductor (OPC). There are provided chargers (215Bk, 215C, 215M, and 215Y), irradiator of laser beams from the image writing unit (120Bk, 120C, 120M, and 120Y), developing devices (200Bk, 200C, 200M, and 200Y) for each color, primary transfer devices (230Bk, 230C, 230M, and 230Y), cleaning devices (300Bk, 300C, 300M, and 300Y), a quencher, etc. around each of the photoconductor (210Bk, 210C, 210M, and 210Y). The developing device (200Bk, 200C, 200M, and 200Y) employs a two-component magnetic brush development method. In addition, an intermediate transfer belt (220) is disposed between each of the photoconductors (210Bk, 210C, 210M, and 210Y) and the primary transfer device (230Bk, 230C, 230M, and 230Y). Each of color toner images is sequentially overlapped from each photoconductor onto the intermediate transfer belt 220 to bear the toner images on each photoconductor.

As the case may be, it is preferable to dispose a pre-transfer charger 502 outside the intermediate transfer belt 220 downstream of the primary transfer position of the final color and upstream of the secondary transfer position. The pre-transfer charger 502 charges the toner image with the same polarity as that of the toner image before the toner image on the intermediate transfer belt 220 transferred from the photoconductor 210 by the primary transfer unit is transferred onto transfer paper as recording medium.

The toner image on the intermediate transfer belt 220 transferred from each photoconductor (210Bk, 210C, 210M, and 210Y) includes a half tone portion, a solid portion, and portions where the amount of overlapped toner varies. Therefore, the charging size varies in some cases. In addition, due to separating discharge occurring at voids on the downstream of the adjacent portion of the primary transfer unit in the moving direction of the intermediate transfer belt, this may cause variation of the charging size in the toner image on the intermediate transfer belt 220 after the primary transfer. This variation of the charging size in the same toner image lowers the transfer margin at the secondary transfer unit by which the toner image on the intermediate transfer belt 220 is transferred to a transfer sheet. Therefore, the toner image before transferred to a transfer sheet is uniformly charged with the same polarity as that of the toner image by the pre-transfer charger to cancel the variation of the charging size in the same toner image, thereby enhancing the transfer margin at the secondary transfer unit.

According to the image forming method, the toner image on the intermediate transfer belt 220 transferred from each photoconductor (210Bk, 210C, 210M, and 210Y) is uniformly charged by the pre-transfer charger 502. Therefore, the transfer property at the secondary transfer unit can be significantly constant over each part of the same toner image on the intermediate transfer belt 220 even if the charging size in the toner image on the intermediate transfer belt 220 varies. Therefore, degradation of the transfer margin during transfer onto a transfer sheet can be suppressed so that the toner image can be stably transferred.

In this image forming method, the charging size (amount) charged by the pre-transfer charger changes depending on the moving speed of the intermediate transfer belt 220 as the subject to be discharged. For example, if the intermediate transfer belt 220 moves slow, the same site of the toner image on the intermediate transfer belt 220 takes a longer time to pass through the charging area of the pre-transfer charger, thereby increasing the charging size (amount). Conversely, if the intermediate transfer belt 220 moves fast, the charging size of the toner image on the intermediate transfer belt 220 decreases. Therefore, if the intermediate transfer belt 220 changes the moving speed in the middle of the toner image on the intermediate transfer belt 220 passing through the charging site of the pre-transfer charger, it is preferable to control the pre-transfer charger in order not to change the charging size to the toner image depending on the change in the moving speed of the intermediate transfer belt 220 in the middle of the operation.

Electroconductive rollers (241, 242, and 243) are disposed between the primary transfer devices (230Bk, 230C, 230M, and 230Y). The transfer sheet is fed from a sheet feeder unit 140 and borne on a transfer belt 180 by way of a pair of registration rollers 160. Thereafter, the toner image on the intermediate transfer belt 220 is transferred to the transfer sheet at the contact point between the intermediate transfer belt 220 and the transfer belt 180 by a secondary transfer roller 170 to form a color image.

The transfer sheet after the image forming is conveyed by the transfer belt 180 to a fixing device 150, where the image is fixed to obtain a fixed color image. The toner remaining on the intermediate transfer belt 220 is removed from the belt by an intermediate transfer belt cleaning device 260.

The polarity of the toner on the intermediate transfer belt prior to transfer to the transfer sheet is negative as with the time of developing. Therefore, a positive transfer bias is applied to the secondary transfer roller 170 to transfer the toner onto the transfer sheet. The nipping pressure at this point has an impact on the transferability and greatly affects fixability. In addition, the toner remaining on the intermediate transfer belt 220 without being transferred is subject to discharging-charging to the positive side at the moment the transfer sheet and the intermediate transfer belt 220 are detached from each other so that that the toner is charged 0 to +. The toner image at the time of paper jamming of the transfer sheet or formed in a non-image area is not affected by the secondary transfer. As a result, the toner is still negatively charged.

Next, the photoconductor cleaner is described. In FIG. 2, the developing devices (200Bk, 200C, 200M, and 200Y) are respectively connected with the cleaning devices (300Bk, 300C, 300M, 300Y) through toner conveying tubes (250Bk, 250C, 250M, and 250Y) indicated by broken lines. Each of the toner conveying tubes (250Bk, 250C, 250M, and 250Y) has a screw inside to convey the toner retrieved by each of the cleaning devices (300Bk, 300C, 300M, 300Y) to each of the developing devices (200Bk, 200C, 200M, and 200Y).

In the typical direct transfer method utilizing the combination of four drum photoconductors and belt transfer, paper dust is attached to the photoconductor due to the contact between the photoconductor and transfer sheets so that retrieved toner contains the paper dust. This causes defects of images such as toner omission during image forming. Therefore, the retrieved toner is not usable for recycling. Moreover, in the typical system made by the combination of a single drum photoconductor and intermediate transfer, attachment of paper dust to the photoconductor is prevented because an intermediate transfer member is employed. However, it is not possible to use the remaining toner on the photoconductor for recycling because it is practically impossible to separate mixed color toner. In addition, a proposition of using the mixed color toner as black toner is dismissed because the mixed color toner does not make black even if all the colors are mixed. Also, the color changes depending on print modes so that toner recycle is not possible in the case of a single photoconductor configuration.

On the other hand, in this full color image forming apparatus, the intermediate transfer belt 220 is used. Therefore, the toner is not contaminated with the paper dust and the attachment of paper dust to the intermediate transfer belt 220 during sheet transfer is prevented. Since each of the photoconductors (210Bk, 210C, 210M, and 210Y) independently uses toner of different color, it is not necessary to separate each of the cleaning devices (300Bk, 300C, 300M, 300Y) so that only toner can be securely retrieved.

The toner positively charged remaining on the intermediate transfer belt is removed by an electroconductive fur brush 262 negatively charged. A bias is applied to the electroconductive fur brush 262 in the same manner as the method of applying a bias to an electroconductive fur brush 261 except that the polarity is different. Almost all of the toner remaining on the toner without being transferred is removed by the two electroconductive fur brushes 261 and 262. The toner, paper dust, talc, etc. escaping from cleaning by the electroconductive fur brush 262 are negatively charged by the negative bias of the electroconductive fur brush 262. The primary transfer for black conducted next is conducted by a positive bias. Therefore, toner, etc. negatively charged are attracted towards the intermediate transfer belt 220, thereby preventing it from being transferred toward the photoconductor 210Bk.

FIG. 3 is a diagram illustrating another example of the image forming apparatus of the present disclosure for use in the image forming method of the present disclosure. The image forming apparatus is a photocopier 100 electrophotography utilizing a tandem type indirect transfer method. The reference numerals 110, 200, 300, and 400 in FIG. 3 respectively represent a photocopying unit, a sheet feeding table carrying the photocopying unit 110, a scanner installed onto the photocopying unit 110, and an automatic document feeder (ADF) further installed onto the scanner 300. The photocopying unit 110 has an intermediate transfer body 50 having an endless form at the center thereof.

As illustrated in FIG. 3, the intermediate transfer body 50 is stretched between a first supporting roller 14, a second supporting 15, and a third supporting roller 16 to be able to rotate clockwise. In this example, on the left side of the second supporting roller 15 of the three rollers, there is provided an intermediate transfer element cleaner 17 to remove residual toner remaining on the intermediate transfer body 50 after image transfer. Four image forming units 18 of yellow, cyan, magenta, and black is arranged side by side along the transfer direction on the intermediate transfer body 50 stretched between the first supporting roller 14 and the second supporting roller 15 of the three rollers to constitute a tandem image forming device 120.

As illustrated in FIG. 3, an irradiator (exposing device) 21 is disposed above the tandem image forming device 120.

In addition, a secondary transfer device 22 is disposed on the opposite side of the tandem image forming device 120 with the intermediate transfer body 50 therebetween. In the examples illustrated in FIG. 3, the secondary transfer device 22 includes a secondary transfer belt 24 having an endless form stretched between two rollers 23 and is disposed pressed against the third supporting roller 16 with the intermediate transfer body 50 therebetween to transfer the image on the intermediate transfer body 50 to a transfer sheet (recording medium). A fixing device 25 is disposed to fix the transferred image on the sheet alongside of the secondary transfer device 22. The fixing device 25 includes a fixing belt 26 having an endless form and a pressure roller 27 pressed against the fixing belt 26. The secondary transfer belt 22 assumes function of conveying the sheet to the fixing device 25 after the image transfer. A transfer roller or a non-contact type charger can be disposed as the secondary transfer device 22. However, such a secondary transfer device is difficult to have this sheet transfer function. In the illustrated embodiment, a reverse device 28 to reverse the sheet to record images on both sides thereof is arranged below the secondary transfer device 22 and the fixing device 25 and in parallel with the tandem image forming device 120.

To make a photocopy using an image forming apparatus employing color electrophotography, a manual is set on a document table of the automatic document feeder 400. Alternatively, the automatic document feeder 400 is opened to set a document on a contact glass 32 for the scanner 300, and thereafter the automatic document feeder 400 is closed to press the document therewith.

When the start button is pressed, the scanner 300 is driven to scan the document on the contact glass 32 with a first scanning unit 33 and a second scanning unit 34 after the document is moved to the contact glass 400 in the case in which the document is set on the automatic document feeder 32 or immediately when the document is set on the contact glass 32. The first scanning unit 33 reflects the light emitted from the light source to the original document and again reflects the reflected light to the second scanning unit 34. The second scanning unit 34 reflects the light with its mirror to a reading sensor 36 via a focusing lens 35 to read the image information.

Also, when the starting switch is pressed, a drive motor rotationally drives one of a supporting rollers 14, 15 and 16 and thus the other two supporting rollers are rotationally driven to rotationally convey the intermediate transfer body 50. At the same time, respective image forming units 18 drive the photoreceptors 10 to form single color images of black, yellow, magenta, and cyan. In synchronization with the transfer of the intermediate transfer body 50, these single color toner images are sequentially transferred to the intermediate transfer body 50 and form a synthesized color image thereon.

In the sheet feeder table 200, one of the sheet feeder rollers 142 is selectively rotated to bring up recording media (sheets) from one of multiple sheet cassettes 144 stacked in a sheet bank 143 when the start button is pressed. A separating roller 145 separates the recording media one by one to feed it to a sheet path 146. Conveying rollers 147 convey and guide the recording medium to a sheet path 148 in the photocopying unit 100 and the recording medium is blocked at a registration roller 49.

Alternatively, a paper feeder roller is rotated to feed sheets (recording paper) on a manual feeder tray 51. Thereafter, the sheets are separated one by one by a separating roller 58. The sheet is fed into a manual feeding path 53 and blocked at the registration roller 49 in the same manner.

The registration roller 49 is rotated in synchronization with the synthesized color image on the intermediate transfer body 50 to feed a sheet between the intermediate body 50 and the secondary transfer device 22, where the image is transferred to the sheet by the secondary transfer device 22.

After image transfer, the sheet is sent by the secondary transfer device 22 to a fixing device 25, where heat and pressure are applied to the sheet to fix the image thereon. Thereafter, a switching claw 55 is thrown to eject the sheet by a ejection roller 56. Alternatively, the switching claw is thrown to enter the sheet into a sheet reversing device 28, where the sheet is reversed and guided to the transfer position again. After an image is recorded on the other side of the sheet, the ejection roller 56 ejects the sheet onto the ejection tray 57.

The residual toner on the intermediate transfer body 50 is removed by an intermediate transfer body cleaning device 17 after image transfer to be ready for the next image formation by the tandem image forming apparatus 120. The registration roller 49 is typically grounded but a bias can be applied thereto to remove paper dust on the sheet.

Process Cartridge

The process cartridge of the present disclosure includes at least a photoconductor to bear a latent electrostatic image, a development device to develop the latent electrostatic image borne on the photoconductor with toner to render the latent electrostatic image visible, and other optional devices such as a charger, an irradiator, a transfer device, a cleaning device, and a quenching device.

The toner manufactured as described above is used as the toner for development.

The development device includes at least a developing agent container to accommodate the toner or the developing agent described above, the developing agent bearing member to bear and transfer the toner or the developing agent accommodated in the developing agent container. The developing device may furthermore optionally include devices such as a layer thickness regulator to regulate the toner layer thickness borne on the developing agent bearing member. To be specific, the one-component developing device and the two-component developing device described in connection with the image forming apparatus and the image forming method can be suitably used.

In addition, as for the charger, the irradiator, the transfer device, the cleaning device, and the quenching device, the same devices as described in connection with the image forming apparatus can be suitably selected and used.

The process cartridge described above is detachably attachable to various electrophotographic image forming apparatuses, facsimile machines, and printers and preferably detachably attachable to the image forming apparatus of the present disclosure.

FIG. 4 is a diagram illustrating an example of the process cartridge of the present disclosure. The process cartridge illustrated in FIG. 4 has a photoconductor 801, a charger 802, a developing device 803, and a cleaning device 805.

In the operation of this process cartridge 800, the photoconductor 801 is rotationally driven at a predetermined peripheral speed. A predetermined negative or positive bias is uniformly applied to the peripheral surface of the photoconductor 801 by the charger 802 in the rotation process of the photoconductor 801. Thereafter, the photoconductor 801 is irradiated with image exposure light such as slit exposure or a laser beam scanning exposure by an image exposing device to sequentially form latent electrostatic images on the peripheral surface of the photoconductor 801. The thus-formed latent electrostatic images are developed with toner by the development device to obtain toner images. The developed toner images are sequentially transferred to a recording medium fed from a paper feeder to the portion between the photoconductor 801 and the transfer device in synchronization with the rotation of the photoconductor 801. The recording medium having the transferred image thereon is separated from the surface of the photoconductor, introduced into the fixing device, where the toner image is fixed on the recording medium and thereafter rejected outside as an output (a photocopy or a print). The surface of the photoconductor 801 after the image transfer is cleared of residual toner remaining thereon by the cleaning device 806, quenched, and ready for the next image formation cycle.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is described in detail with reference to Examples but not limited to the following Examples.

The method of manufacturing toner for use in image forming in Examples and Comparative Examples is described below.

Manufacturing Toner

Synthesis of Amorphous Polyester Resin A1

A mixture (alcohol component) of 3-methyl-1,5-pentanediol and trimethylol propane with a molar ratio of 97:3 and adipic acid (acid component) were loaded together with titanium tetraisopropoxide (300 ppm to resin component) in a reaction container equipped with a condenser, a stirrer, and a nitrogen introducing tube in such a manner that the ratio of OH to COOH was 1.1 to 1. Thereafter, the system was heated to 200 degrees C. in about four hours and thereafter heated to 230 degrees C. in two hours until effluent water ran out.

Thereafter, the resultant was caused to conduct reaction for five hours with a reduced pressure of 10 to 15 mm Hg to obtain an intermediate polyester.

Next, the intermediate polyester and isophorone diisocyanate were loaded in the reaction container equipped with a condenser, a stirrer, and a nitrogen introducing tube in a molar ratio of 2.1 to 1. Thereafter, the resultant was diluted with ethyl acetate to be 48 percent by mass. Thereafter, the resultant was caused to conduct reaction at 100 degrees C. for five hours to obtain an amorphous polyester resin A1 having a reactive group.

The number average molecular weight (Mn) was 3,800, the weight average molecular weight (Mw) was 17,500, and the glass transition temperature (Tg) was −50 degrees C.

Synthesis of Amorphous Polyester Resin A2

A mixture (alcohol) of an adduct of bisphenol A with 2 mols of ethylene oxide and an adduct of bisphenol A with 3 mols of proplyene oxide in a molar ratio of 85:15 and a mixture (acid component) of isophhtalic acid and adipic acid in a molar ratio of 80 to 20 were loaded in a four-necked flask equipped with a nitrogen introducing tube, a dehydrating tube, a stirrer, and a thermocouple in a ratio of OH:COOH=1.3:1.

Thereafter, the system was caused to conduct reaction together with 500 ppm titanium tetraisopropoxide at 230 degrees C. for 10 hours at normal pressure, followed by 5 hour reaction with a reduced pressure of 10 to 15 mmHg. Thereafter, 30 parts of trimellitic anhydride was placed in the reaction container at 180 degrees C. at normal pressure for three hours to obtain an amorphous polyester resin A2. The number average molecular weight (Mn) was 2,400, the weight average molecular weight (Mw) was 5,400, and the glass transition temperature (Tg) was 48 degrees C.

Synthesis of Crystalline Polyester Resin B

A mixture (acid component) of dimethyl fumarate and dimethyl sebacate in a molar ratio of 90:10, 1,6-hexane diol (alcohol component) in an amount of 1.15 times as that of the acid component), Ti(OBu)$_4$ serving as catalyst was placed in a heated and dried two-necked flask. Thereafter, air in the vessel was changed to nitrogen gas inert atmosphere by a reduced pressure operation followed by reflux by mechanical stirrer at 180 degrees C. for five hours. Thereafter, excessive 1,6-hexane diol was removed by evaporation with a reduced pressure. Thereafter, the system was stirred for two hours while gradually heating the system to 230 degrees C. After the system became viscous, it was cooled down to cease the reaction. Before the product became solid, tetrahydrofuran (THF) was added to the reaction container to remove catalyst remnants by a pressure filtration device. Refining was conducted using THF/MeOH to retrieve a re-precipitation followed by drying under a reduced pressure to obtain a crystalline polyester resin B having an unsaturated double bond. The number average molecular weight (Mn) was 3,900, the weight average molecular weight (Mw) was 13,800, and the melting point was 68 degrees C.

Synthesis of Ketimine Compound 170 parts of isophoronediamine and 75 parts of methyl ethyl ketone were placed in a reaction container equipped with a stirrer and a thermometer to conduct reaction at 50 degrees C. for 5 hours to obtain a ketimine compound having an amino value of 418.

Preparation of Master Batch (MB)

After kneading the mixture having the following recipe by two rolls at 150 degrees C. for 30 minutes, the resultant was rolled and cooled down and thereafter pulverized by a pulverizer to obtain a master batch.

| | |
|---|---|
| Carbon Black (Printex 35, manufactured by Degussa AG) (DBP oil absorbing amount = 42 mL/100 mg, pH = 9.5): | 44 parts |
| Amorphous polyester resin A1: | 100 parts |
| Amorphous polyester resin A2: | 1,100 parts |
| Water: | 200 parts |

Preparation of Liquid Dispersion of Pigment and Wax

The mixture having the following recipe was loaded in a container equipped with a stirrer and a thermometer and heated to 80 degrees C. while being stirred. After the system was kept at 80 degrees C. for five hours, it was cooled down to 30 degrees C. in one hour.

| | |
|---|---|
| Crystalline Polyester Resin B having an unsaturated double bond: | 220 parts |
| Paraffin wax (hydrovcarbon-based was, HNP-9, melting point: 75 degrees C., SP value: 8.8, manufactured by Nihon Seiko Co., LTD.): | 50 parts |
| Charge control agent (CCA, salicylic acid metal complex: E-84, manufactured by Orient Chemical Industries Co., Ltd.): | 23 parts |
| Ethyl acetate: | 947 parts |

Next, the following recipe was loaded in the container and mixed for one hour to obtain a raw material solution.

| | |
|---|---|
| Master Batch mentioned above: | 500 parts |
| Ethyl acetate: | 500 parts |

1,324 parts of the raw material solution was dispersed by a bead mill under the following condition.

Dispersion Condition

Liquid sending speed: 1 kg/hr

Disk peripheral speed: 6 m/s

Dispersing media: 80 percent volume filled with zirconia bead having a diameter of 0.5 mm Number of passes: 3 times Next, 1,042 parts of 65 percent ethyl acetate solution of the amorphous polyester resin A was added and subject to passing by the bead mil under the condition specified above to obtain a liquid dispersion of pigment and wax.

The concentration of the solid portion of the liquid dispersion of pigment and wax was 50 percent.

Preparation of Oil Phase

| | |
|---|---|
| Liquid dispersion of pigment and wax: | 664 parts |
| Polyester Resin A1: | 80 parts |
| Ketimine compound: | 4.6 parts |

The recipe specified above was loaded in a container and mixed at 5,000 rpm by a TK homomixer (manufactured by PRIMIX Corporation) to obtain an oil phase.

Synthesis of Organic Particulate Emulsion

The following recipe was loaded in a reaction container equipped with a stirrer and a thermometer and stirred at 400 rotations/minute for 15 minutes to obtain a white cloudy liquid.

| | |
|---|---|
| Water: | 683 parts |
| Sodium salt of sulfuric acid ester of adduct of methacrylic acid with ethylene oxide (ELEMINOL RS-30, manufactured by Sanyo Chemical Industries, Ltd.): | 11 parts |
| Styrene: | 138 parts |
| Methacrylic acid: | 138 parts |
| Ammonium persulfate: | 1 part |

The white cloudy liquid was heated until the temperature in the system reached 75 degrees C. to conduct reaction for five hours.

Furthermore, 30 parts of 1 percent ammonium persulfate aqueous solution was added and aged at 75 degrees C. for five hours to obtain an aqueous liquid dispersion of [Liquid Dispersion of Particulate] of a vinyl-based resin (copolymer of styrene, methacrylic acid, and a sodium salt of a sulfuric acid ester of an adduct of methacrylic acid with ethyleneoxide).

This liquid dispersion of particulate was partially dried to isolate the resin portion.

Preparation of Aqueous Phase

The following recipe was mixed and stirred to obtain a white cloudy liquid. This was determined as [Aqueous Phase].

| | |
|---|---|
| Water: | 990 parts |
| Liquid dispersion of particulate: | 83 parts |
| 48.5 percent aqueous solution of dodecyldiphenyl ether sodium disulfonate (EREMINOR MON-7, manufactured by Sanyo Chemical Industries, Ltd.): | 37 parts |
| Ethyl acetate: | 90 parts |

Emulsifying and Removal of Solvent 1,200 parts of the aqueous phase was loaded in a container in which the oil phase was placed. The resultant was mixed by a TK HOMOMIXER at 13,000 rpm for 20 minutes to obtain emulsified slurry.

The emulsified slurry was loaded in a container equipped with a stirrer and a thermometer followed by removing the solvent at 30 degrees C. for eight hours.

Step of Reaction of Unsaturated Group

After a catalyst amount of a water-soluble radical polymerization initiator (V-44, manufactured by Wako Pure Chemical Industries, Ltd.) was added to the slurry obtained after the removal of solvent, the resultant was aged at 50 degrees C. for five hours to react the unsaturated double bond of the polyester resin B to obtain slurry dispersion.

Rinsing and Drying

After 100 parts of the slurry dispersion was filtrated with a reduced pressure, the following operations of 1 to 5 were conducted.

(1): 100 parts of deionized water was added to the filtered cake and the resultant was mixed by a TK HOMOMIXER (at 12,000 rpm for 10 minutes) followed by filtration;
(2): 100 parts of 10 percent sodium hydroxide aqueous solution was added to the filtered cake obtained in (1) and the resultant was mixed by a TK HOMOMIXER (at 12,000 rpm for 30 minutes) followed by filtration with a reduced pressure;
(3): 100 parts of 10 percent hydrochloric acid was added to the filtered cake obtained in (2) and the resultant was mixed by a TK HOMOMIXER (at 12,000 rpm for 10 minutes) followed by filtration;
(4): 300 parts of deionized water was added to the filtered cake obtained in (3) and the resultant was mixed by a TK HOMOMIXER at a rotation number of 12,000 rpm for 10 minutes followed by filtration operations of (1) to (3) mentioned above twice to obtain a filtered cake; and
(5): the filtered cake obtained in (4) was dried by an air circulating drier at 45 degrees C. for 48 hours. The dried cake was sieved using a screen having an opening of 75 μm to obtain toner.

The thus-obtained toner is defined as Toner A.

Example 1

The liquid application for an intermediate layer including the following recipe was applied to an aluminum support (having an outer diameter of 60 mm) by a dipping method to form an intermediate layer. The thickness of the intermediate layer was 5 μm after being dried at 170 degrees C. for 30 minutes.

Liquid Application for Intermediate Layer

| | |
|---|---|
| Particle of zinc oxide (MA-300, manufactured by TAYCA CORPORATION): | 350 parts |
| 1,3.,5-tris(3-meracaptobutylyloxyethyl)-1,3,5-triadine-2,4,6(1H,3H,5H)-trione (KARENZ™, MT NR1, manufactured by Showa Denko K.K.): | 1.5 parts |
| Blocked isocyanate : "SUMIJYU-RU", 3175, concentration of solid portion: 75 percent by mass, manufactured by "SUMIKA BAYERN URETAHNE CO., Ltd.): | 60 parts |
| 20 percent by mass solution in which butyral resin was dissolved in 2 butanone (BM-1, manufactured by SEKISUI CHEMICAL CO., LTD.): | 225 parts |
| 2-Butanone: | 365 parts |

The liquid application for charge generating layer having the following recipe was dip-coated onto the obtained intermediate layer to form a charge generating layer. The thickness of the charge generating layer was 0.2 μm.

Liquid Application for Charge Generating Layer

| | |
|---|---|
| Y type titanyl phthalocyanine: | 6 parts |
| Butyral resin (S-LEC BX-1, manufactured by SEKISUI CHEMICAL CO., LTD.): | 4 parts |
| 2-butanone (manufactured by Kanto Chemical Co., Inc.): | 200 parts |

The liquid application for charge transport layer having the following recipe was dip-coated onto the obtained charge generating layer to form a charge transport layer. The thickness of the charge transport layer was 22 μm after being dried at 135 degrees C. for 20 minutes.

Liquid Application for Charge Transport Layer

| | |
|---|---|
| Bisphenol Z type polycarbonate (Panlite TS-2050, manufactured by TEIJIN CHEMICALS LTD.): | 10 parts |
| Charge transport material having a low molecular weight represented by the following chemical structure: | 10 parts |

-continued

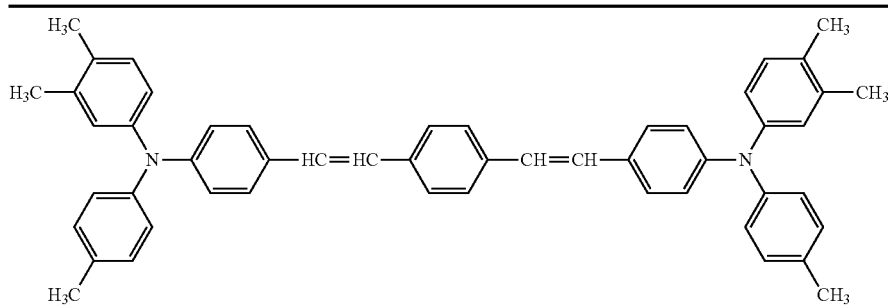

Chemical formula 5

| Tetrahydrofuran: | 80 parts |

The liquid application for cross-linked surface layer having the following recipe was spray-applied to the charge transport layer in the nitrogen atmosphere and left in the nitrogen atmosphere for 10 minutes followed by drying by finger touch. Thereafter, the resultant was placed in a UV irradiation booth in which air was replaced with nitrogen gas in such a manner that the oxygen concentration was 2 percent or less and irradiated with light.

Surface Layer

Moreover, the resultant was dried at 130 degrees C. for 20 minutes to obtain a photoconductor of Example 1. The thickness of the surface layer of the cross-linking resin was 4.5 μm.

Light Irradiation Condition

Metal halide lamp: 160 W/cm

Irradiation distance: 120 mm

Irradiation intensity: 700 mW/cm$^2$

Irradiation time: 60 seconds

Liquid Application for Surface Layer of Cross-linking Resin

| | |
|---|---|
| Trimethylol propane triacrylate (KAYARAD TMPTA, manufactured by Nippon Kayaku Co., Ltd., acrylic equivalent: 99, radical polymerizable monomer having three or more functional groups with no charge transport structure: | 5 parts |
| Dipentaerythritol caprolactone-modified hexaacrylate (KAYARAD DPCA-120, acrylic equivalent: 324, manufactured by Nippon Kayaku Corporation): | 5 parts |
| Radical polymerizable compound having the charge transport structure having a single functional group represented by the following chemical formula 6 (acrylic equivalent: 420): | 10 parts |

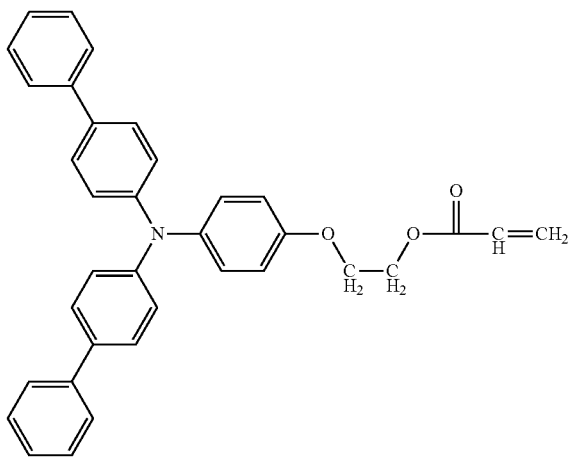

Chemical formula 6

| | |
|---|---|
| 1-hydroxy-cyclohexyl-phenyl-ketone (photopolymerization initiator, IRGACURE 184, manufactured by Chiba Specialty Chemicals): | 1 part |
| Tetrahydrofuran | 100 parts |

After the thus-manufactured photoconductor of Example 1 was prepared for installation, it was installed onto a black developing station of an electrophotography machine (Ricoh Pro C751EX, manufactured by Ricoh Company Ltd.) to obtain a print image using the toner A.

Image data in which a solid square pattern including white-out texts and a half tone image having independent dot patterns per two dots were sequentially output during the first rotation and the second rotation of the drum photoconductor by which development started was printed out on photocopying paper (My Paper, A3, manufactured by NBS Ricoh Co., Ltd.). The image density was 1,200 dpi×1,200 dpi.

Example 2

The photoconductor of Examples 2 was obtained in the same manner as in Example 1 except that the charge transport material of the liquid application for charge transport layer was changed to the compound represented by the following chemical formula 7.

Print images were obtained using the photoconductor of Example 2 and the toner A.

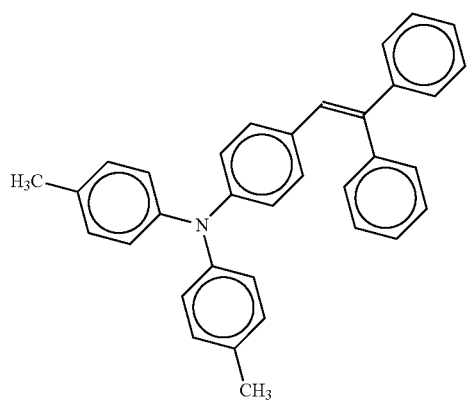

Chemical formula 7

Example 3

The photoconductor of Examples 3 was obtained in the same manner as in Example 1 except that the radical polymerizable compound having a charge transport structure having a single functional group of the liquid application surface layer of cross-linking resin was changed to the compound represented by the following chemical formula 8.

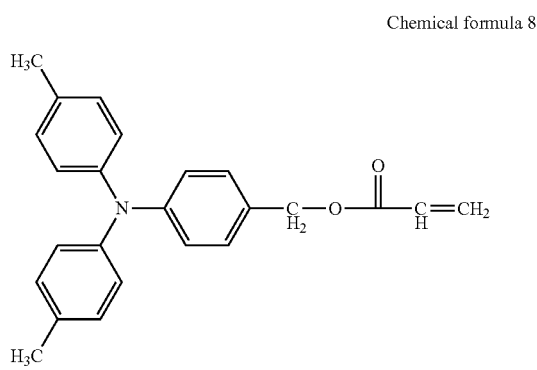 [SMILES: C=CC(=O)OCc1ccc(N(c2ccc(C)cc2)c2ccc(C)cc2)cc1]

Chemical formula 8

Print images were obtained using the photoconductor of Example 3 and the toner A.

Example 4

The photoconductor of Examples 4 was obtained in the same manner as in Example 3 except that the charge transport material of the liquid for charge transport layer was changed to the compound represented by the following chemical formula 7.

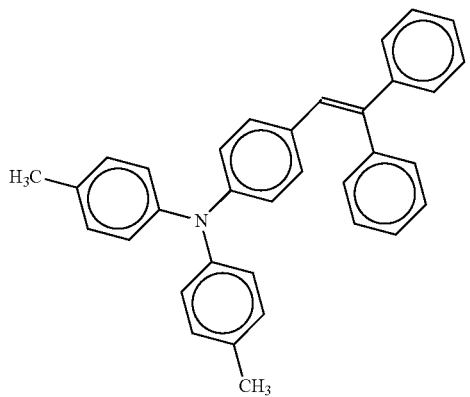

Chemical formula 7

Print images were obtained using the photoconductor of Example 4 and the toner A.

Example 5

Print images were obtained in the same manner as in Example 1 except that the toner used in Example 1 was changed to the proper cyan toner for Ricoh Pro C7110.

Example 6

Print images were obtained in the same manner as in Example 1 except that the toner used in Example 1 was changed to the proper magenta toner for Ricoh Pro C7110.

Example 7

Print images were obtained in the same manner as in Example 1 except that the toner used in Example 1 was changed to the proper magenta toner for Ricoh Pro C751EX.

Example 8

The photoconductor of Example 8 was obtained in the same manner as in Example 1 except that the radical polymerizable compound having a charge transport structure having a single functional group of the liquid application surface layer of cross-linking resin was changed to the compound represented by the following chemical formula 9. Print images were obtained in the same manner as in Example 1 except that this photoconductor and the toner used in Example 1 were changed to the proper photoconductor and the proper magenta toner for Ricoh Pro C751EX.

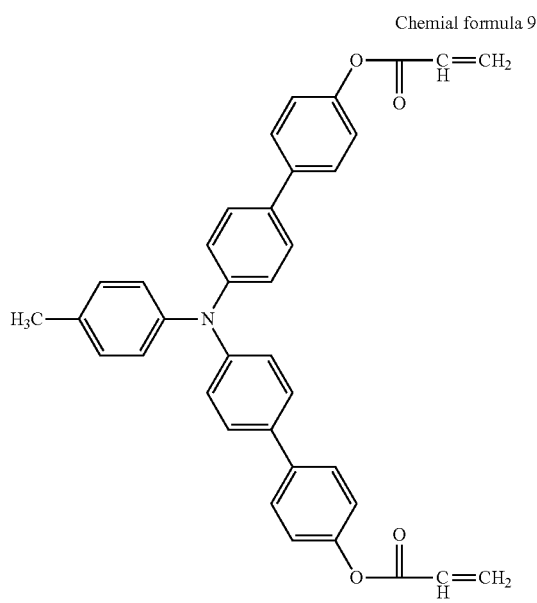 [SMILES: C=CC(=O)Oc1ccc(-c2ccc(N(c3ccc(C)cc3)c3ccc(-c4ccc(OC(=O)C=C)cc4)cc3)cc2)cc1]

Chemical formula 9

Example 9

The photoconductor of Example 9 was obtained in the same manner as in Example 1 except that the liquid application for the charge transport layer and the liquid application for surface layer of cross-linking resin of the surface layer were changed to the following.

Liquid Application for Charge Transport Layer

| | |
|---|---:|
| Bisphenol Z type polycarbonate (Panlite TS-2050, manufactured by TEIJIN CHEMICALS LTD.): | 10 parts |
| Charge transport material having a low molecular weight representedby the following chemical formula 7: | 10 parts |

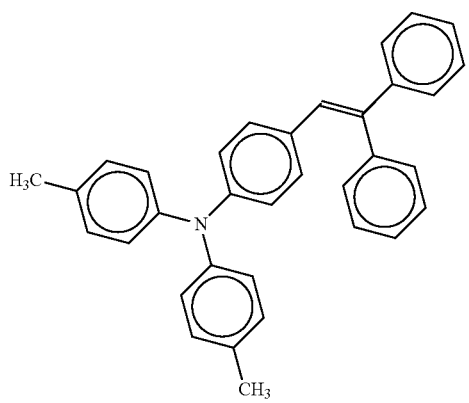

Chemical formula 7

| | |
|---|---:|
| Tetrahydrofuran : | 80 parts |
| Silicone oil (KF-50-100CS, manufactured by Shin-Etsu Chemical Co., Ltd.): | 0.002 parts |

Liquid Application of Surface Layer

| | |
|---|---:|
| Bisphenol Z type polycarbonate (Panlite TS-2050, manufactured by TEIJIN CHEMICALS LTD.): | 53 parts |
| Charge transport material having a low molecular weight represented by the following chemical formula 7: | 37 parts |

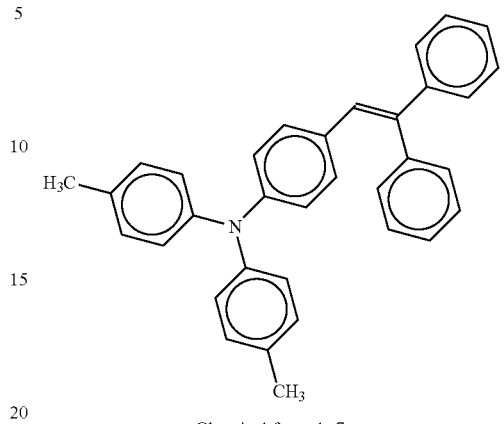

Chemical formula 7

| | |
|---|---:|
| α-alumina (SUMICORUNDUM AA-03, manufactured by Sumitomo Chemical Co., Ltd.): | 32 parts |
| Dispersant (BYK-P105, manufactured by BYK Japan KK): | 0.4 parts |
| Tetrahydrofuran: | 2,000 parts |
| Cyclohexanone: | 600 parts |

The charge transport layer was dip-coated and thereafter heated and dried at 135 degrees C. for 20 minutes. The average thickness of the charge transport layer was 20 μm. The liquid application for surface layer was spray-coated onto thus-obtained charge transport layer and thereafter heated and dried at 150 degrees C. for 20 minutes. The average thickness of the surface layer was 5 μm.

Print images were obtained in the same manner as in Example 1 except that this photoconductor and the toner used in Example 1 were changed to the proper photoconductor and the proper magenta toner for Ricoh Pro C751EX.

Example 10

The photoconductor of Example 10 was obtained in the same manner as in Example 1 except that the liquid applications for the intermediate layer, the charge generating layer, and the charge transport layer of Example 1 were changed to the following for dip coating to obtain an intermediate layer having a thickness of 5 μm, a charge generating layer having a thickness of 1 μm, and a charge transport layer having a thickness of 20 μm. Print images were obtained in the same manner as in Example 1 except that this photoconductor and the toner used in Example 1 were changed to the proper photoconductor and the proper magenta toner for Ricoh Pro C751EX.

Liquid Application for Intermediate Layer

| | |
|---|---:|
| Titanium Oxide (CR-EL, manufactured by ISHIHARA SANGYO KAISHA, LTD): | 30 parts |
| Titanium Oxide (PT-401M, manufactured by ISHIHARA SANGYO KAISHA, LTD.: | 10 parts |
| Alkyd resin (Beckozole M6401-50, manufactured by Dainippon Ink and Chemicals, Inc.; Solid portion: 50%): | 8 parts |
| Melamine resin (G-821-60, solid portion: 60 percent, manufactured by DIC Corporation): | 5 parts |
| 2-butanone: | 54 parts |

Liquid Application for Charge Generating Layer

Asymmetric disazo pigment represented by the following chemical structure Y: 24 parts

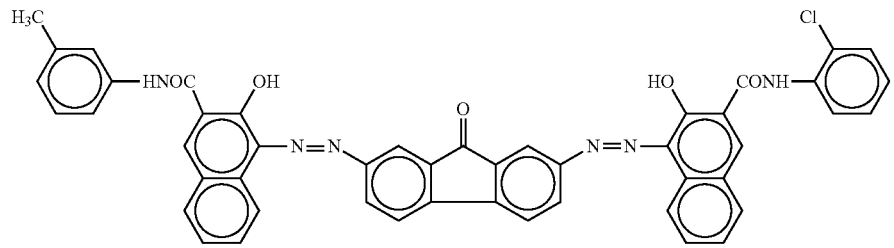

Chemical structure Y

| | |
|---|---:|
| Metal-free phthalocyanine pigment: | 12 parts |
| Polyvinyl butyral (Butver-B90): | 7 parts |
| Cyclohexanone: | 625 parts |
| 2-butanone: | 330 parts |

Liquid Application for Charge Transport Layer

| | |
|---|---:|
| Bisphenol Z type polycarbonate (Panlite TS-2050, manufactured by TEIJIN CHEMICALS LTD.): | 10 parts |
| Charge transport material having a low molecular weight represented by the following chemical formula 7: | 10 parts |

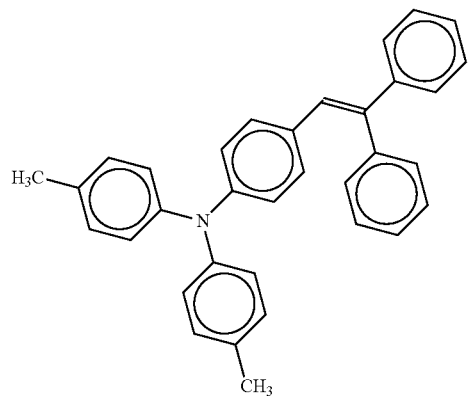

Chemical formula 7

| | |
|---|---:|
| Tetrahydrofuran: | 80 parts |
| Silicone oil (KF-50-100CS, manufactured by Shin-Etsu Chemical Co., Ltd.): | 0.002 parts |

The liquid application for cross-linked surface layer having the following recipe was spray-applied to the charge transport layer in the nitrogen atmosphere and left in the nitrogen atmosphere for 10 minutes followed by drying by finger touch. Thereafter, the resultant was placed in a UV irradiation booth in which air was replaced with nitrogen gas in such a manner that the oxygen concentration was 2 percent or less and irradiated with light.

Surface Layer

Moreover, the resultant was dried at 130 degrees C. for 20 minutes to obtain a photoconductor of Example 10. The thickness of the surface layer of the cross-linking resin was 4.5 μm.

Light Irradiation Condition
Metal halide lamp: 160 W/cm
Irradiation distance: 120 mm
Irradiation intensity: 700 mW/cm$^2$
Irradiation time: 60 seconds Liquid Application for Surface Layer of Cross-Linking Resin

| | |
|---|---:|
| Trimethylol propane triacrylate (KAYARAD TMPTA, manufactured by Nippon Kayaku Co., Ltd., acrylic equivalent: 99, radical polymerizable monomer having three or more functional groups with no charge transport structure: | 5 parts |
| Dipentaerythritol caprolactone-modified hexaacrylate (KAYARAD DPCA-120, acrylic equivalent: 324, manufactured by Nippon Kayaku Corporation): | 5 parts |
| Radical polymerizable compound having the charge transport structure having a single functional group represented by the following chemical formula 6 (acrylic equivalent: 420): | 10 parts |

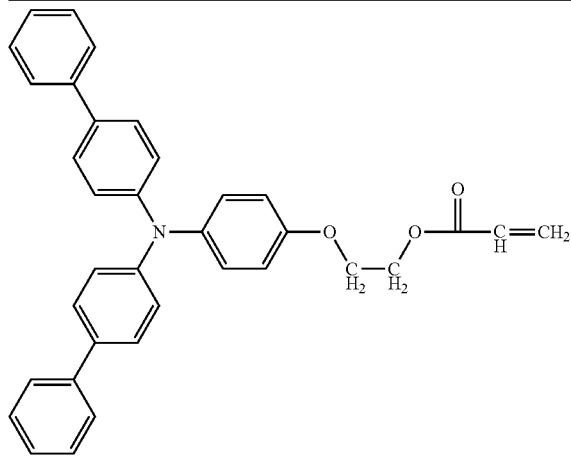

Chemical formula 6

| | |
|---|---|
| 1-hydroxy-cyclohexyl-phenyl-ketone (photopolymerization initiator, IRGACURE 184, manufactured by Chiba Specialty Chemicals)}: | 1 part |
| Tetrahydrofuran: | 100 parts |

Example 11

A photoconductor was obtained in the same manner as in Comparative Example 3 that the intermediate layer was changed to the intermediate layer of Example 1. Print images were obtained in the same manner as in Example 1 except that this photoconductor and the toner used in Example 1 were changed to the proper photoconductor and the proper magenta toner for Ricoh Pro C751EX.

Comparative Example 1

The photoconductor of Comparative Example 1 was obtained in the same manner as in Example 1 except that the radical polymerizable compound having a charge transport structure having a single functional group was changed to the compound represented by the following chemical formula 11.

Print images were obtained using the photoconductor of Comparative Example 1 and the toner A.

Chemical formula 11

Comparative Example 2

Print images were obtained in the same manner as in Example 1 except that the toner used in Example 1 was changed to the proper black toner for Ricoh Pro C751EX.

Comparative Example 3

The photoconductor of Comparative Example 3 was obtained in the same manner as in Example 1 except that the radical polymerizable compound having a charge transport structure having a single functional group of the liquid application surface layer of cross-linking resin was changed to the compound represented by the following chemical formula 12. Print images were obtained in the same manner as in Example 1 except that this photoconductor and the toner used in Example 1 were changed to the proper photoconductor and the proper magenta toner for Ricoh Pro C751EX.

Chemical formula 12

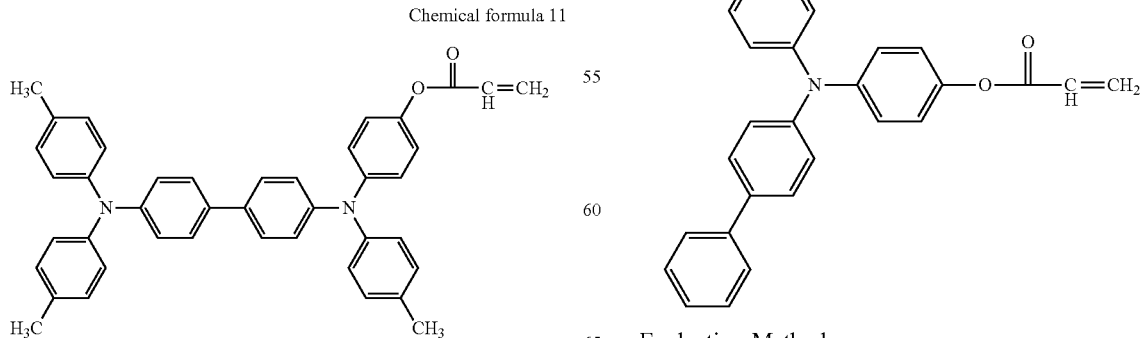

Evaluation Method

Negative residual images of the half tone portion of a manual having an image area ratio of 6 percent output by each image forming apparatus were evaluated after a run length of 1,000,000 sheets. The conditions of the image forming apparatus were adjusted to be the same as follows.

Primary transfer current: 35 μA
Charging voltage of photoconductor: −600 V
Development bias: −500 V
Toner concentration of developing device: 8.3 to 8.5 percent
Development γ: 1.2 to 1.4 (mg/cm$^2$)/−kV Development γ represents a gradient of the portion subject to linear approximation of the curve representing the relation between the difference between the voltage of the photoconductor and the development bias and the amount of toner.

The negative residual image was evaluated by five grades.
5: None
4: Difficult to distinguish but provide impression that residual images occurred
3: Very slight residual image observed
2: Slight residual image occurred but tolerable
1: Residual image clearly observed and intolerable Method of Measuring Ionization Potential The following photoconductor was measured: an electroconductive substrate having a diameter of 60 mm, to which an intermediate layer, a charge generating layer, a charge transport layer, and a surface layer of cross-linking resin are applied and dried. 20 mm square of the center portion relative to the drum axis direction was cut out and used in an ionization potential measuring device (PYS-202, manufactured by Sumitomo Heavy Industries, Ltd.)

Toner powder received in a circular aluminum container having a diameter of 20 mm was used in the measuring device to measure the toner.

To measure the ionization potential of each layer of the photoconductor, when measuring the ionization potential of the charge transport layer formed inside the surface of the photoconductor formed of the surface layer of cross-linking resin, the surface of the cross-linking resin was polished by wrapping film to use the photoconductor having the cross-linking agent completely exposed for the measuring. The ionization potential of the charge generating layer was measured as follows: The charge transport layer was peeled-off and the attached matter of the charge generating material remaining on the intermediate layer was used as the ionization potential measuring sample of the charge generating layer. Moreover, for the ionization potential measuring of the intermediate layer, the surface of the intermediate layer to which the charge generating material is attached is rinsed and dried to be used as a sample. Furthermore, after the electroconductive substrate on which the intermediate layer remained was dipped in a solvent mixture of methylethyl ketone and tetrahydrofuran for two days, the intermediate layer was removed with cotton and the solvent used for rinsing was evaporated. The thus-obtained was used as the measuring sample of the ionization potential of the electroconductive substrate. Also, a sample was made which included an electroconductive substrate on which a simple layer of a charge generating layer or a charge transport layer was formed as the uppermost layer. The ionization potential was measured and the result was not different from the sample made as described above. However, the ionization potential appeared to increase if the electroconductive substrate was left still for a long period of time. Therefore, in particular, the measuring was conducted immediately after the surface was rinsed.

The electroconductive substrate and the intermediate layer were exposed to Xenon lamp of and the others were exposed to D2 lamp. The photocurrent during homogeneous light irradiation via a monochrome meter was measured. Photoelectron yield was calculated by dividing the number of photons of the irradiation light. The power source was disposed between the earth and the sample and −100 V was applied to the sample. In addition, the measuring was conducted under the vacuum condition of $1 \times 10^{0.2}$ Pa. Regarding the photoelectron yield, measuring data was acquired using a control and analysis software installed onto the ionization potential measuring device. Thereafter, a graph was created from the relation of cubic root of all the electron yield of photoelectron against the incident light energy using a spreadsheet software (Excel, available from Microsoft). The energy value at the intersection of two approximated straight lines against the obtained curve (graph) was defined as the ionization potential. Incidentally, the approximated straight lines can be drawn following the typical example illustrated in FIG. 1. Depending on how to draw the approximated straight line, the ionization potential has a slight fluctuation. If the conditions of the present disclosure is within such a fluctuation range, it does not cause a problem.

The measuring results and the image evaluation results of the ionization potential are shown in Table 1 and Table 2.

TABLE 1

|  | Charge generating layer (eV) | Charge transport layer (eV) | Surface of photoconductor (eV) | Toner (eV) |
|---|---|---|---|---|
| Example 1 | 5.20 | 5.15 | 5.45 | 5.35 |
| Example 2 | 5.20 | 5.41 | 5.45 | 5.35 |
| Example 3 | 5.20 | 5.15 | 5.53 | 5.35 |
| Example 4 | 5.20 | 5.41 | 5.53 | 5.35 |
| Example 5 | 5.20 | 5.15 | 5.45 | 5.33 |
| Example 6 | 5.20 | 5.15 | 5.45 | 5.5 |
| Example 7 | 5.20 | 5.15 | 5.45 | 5.52 |
| Example 8 | 5.20 | 5.15 | 5.53 | 5.52 |
| Example 9 | 5.20 | 5.41 | 5.41 | 5.52 |
| Example 10 | 5.42 | 5.41 | 5.45 | 5.52 |
| Example 11 | 5.42 | 5.41 | 5.45 | 5.52 |
| Comparative Example 1 | 5.20 | 5.15 | 5.22 | 5.35 |
| Comparative Example 2 | 5.20 | 5.15 | 5.45 | 5.70 |
| Comparative Example 3 | 5.20 | 5.15 | 5.65 | 5.52 |

TABLE 2

|  | Ionized potential difference between surface of photoconductor and surface of toner eV | Ionized potential of surface of photoconductor eV | Gradient of base line | Ionized potential difference between charge generating layer and charge transport layer eV | Ionized potential difference between charge generating layer and surface of photoconductor eV |
|---|---|---|---|---|---|
| Example 1 | 0.10 | 5.45 | 0 | 0.05 | 0.30 |
| Example 2 | 0.10 | 5.45 | 0 | 0.21 | 0.04 |
| Example 3 | 0.18 | 5.53 | 0.001 | 0.05 | 0.38 |

TABLE 2-continued

| | | | | | |
|---|---|---|---|---|---|
| Example 4 | 0.18 | 5.53 | 0.001 | 0.21 | 0.12 |
| Example 5 | 0.12 | 5.45 | 0 | 0.05 | 0.30 |
| Example 6 | 0.05 | 5.45 | 0 | 0.05 | 0.30 |
| Example 7 | 0.07 | 5.45 | 0 | 0.05 | 0.30 |
| Example 8 | 0.01 | 5.53 | 0 | 0.05 | 0.38 |
| Example 9 | 0.01 | 5.53 | 0 | 0.21 | 0.00 |
| Example 10 | 0.07 | 5.45 | 0 | 0.01 | 0.04 |
| Example 11 | 0.07 | 5.45 | 0 | 0.01 | 0.04 |
| Comparative Example 1 | 0.13 | 5.22 | 0 | 0.05 | 0.07 |
| Comparative Example 2 | 0.20 | 5.45 | 0 | 0.05 | 0.30 |
| Comparative Example 3 | 0.13 | 5.65 | 0 | 0.05 | 0.50 |

| | Filler (Intermediate layer) | Evaluation on negative residual image Grade |
|---|---|---|
| Example 1 | ZnO | 5 |
| Example 2 | ZnO | 4 |
| Example 3 | ZnO | 4 |
| Example 4 | ZnO | 3 |
| Example 5 | ZnO | 5 |
| Example 6 | ZnO | 5 |
| Example 7 | ZnO | 5 |
| Example 8 | ZnO | 4 |
| Example 9 | ZnO | 4 |
| Example 10 | $TiO_2$ | 4 |
| Example 11 | ZnO | 5 |
| Comparative Example 1 | ZnO | 2 |
| Comparative Example 2 | ZnO | 2 |
| Comparative Example 3 | ZnO | 2 |

The negative residual image is thought to appear due to local variation of chargeability of a photoconductor. In particular, as the electrophotography process speeds up, the image forming process continues in a period of time shorter than the time to be taken for uniformly relaxing the photoconductor. Accordingly, the history of the photoconductor accumulates, which causes negative residual image.

In the electrophotography process, a photoconductor is not only negatively charge, but also positively charged during transfer. A photoconductor stocks charges to a predetermined voltage of both polarities between electrodes and bulk. However, it is desirable not to accumulate the charges.

The photoconductor of Example 1 has a smaller ionization potential difference between the intermediate layer and the charge generating layer than the photoconductor of Comparative Example 1 so that the charge at this interface does not easily accumulate. This is thought to advantageously work to suppress the occurrence of the negative residual image.

Toner used for development on the photoconductor can be the cause of the local difference of chargeability of a photoconductor. Charging and infusion of charges of the photoconductor by a transfer device are thought to be shielded by such toner. In comparison with the toner of Comparative Example 3, the toner of Example 1 has a relatively small ionization potential difference on the surface of the photoconductor. This relation it deduced to weaken the shield effect. Therefore, the occurrence of negative residual images is suppressed.

In comparison between Example 1 and Example 2. Example 1 had a better result one above than Example 2 with regard to the negative residual image.

The photoconductor of Example 1 has a different gradient of the base line of the spectrum obtained in the measuring of the ionization potential of the surface of the photoconductor. The gradient is zero in Example 1 while the gradient is slight in Example 2. The reason why the base line has a gradient is thought that fluctuation of the energy level of hopping sites in charge of charge transport is large. This is thought to temporarily stock charges as slight trapping sights, which affects negative residual images. The same applies to the relation between Example 3 and Example 4.

The photoconductors of from Example 1 to Example 11 have higher ionization potentials of the surface thereof than that of Comparative Example 1. This property is thought to suppress modification of the surface of a photoconductor. Therefore, changes of chargeability is thought to be suppressed even for a printing with a large run length. This is thought to contribute to suppression of the occurrence of the negative residual image.

Uniformity of the surface voltage of a photoconductor after transfer process is preferably less affected by toner. Therefore, small ionization potential on the surface of a photoconductor is advantageous considering the electrostatic shield effect to the toner and the surface of the photoconductor. On the other hand, if the ionization potential on the surface of a photoconductor is excessively small, chemical stability is degraded. As a result, modification occurs, which has an adverse impact on the property of residual images. This relation applies between Example 1 and Comparative Example 1 and Comparative Example 3. Therefore, the range of the present disclosure is in particular advantageous in terms of the property of residual images.

According to the image forming method of the present disclosure, it is possible to suppress occurrence of negative residual image.

Having now fully described embodiments of the present invention, it will be apparent to one of ordinary skill in the art that many changes and modifications can be made thereto without departing from the spirit and scope of embodiments of the invention as set forth herein.

What is claimed is:

1. An image forming method comprising:

forming an image with a toner using a photoconductor in which an intermediate layer and a photosensitive layer including a charge generating layer and a charge transport layer are formed overlying an electroconductive substrate, wherein the toner comprises a releasing agent having a melting point of from 50 to 120 degrees C., wherein an ionization potential of a surface of the photoconductor and an ionization potential of a surface of the toner satisfy the following relations 1 and 2, $|Ip$ (the surface of the photoconductor)$-Ip$ (the surface of the toner)$|\leq 0.18$ (eV)     Relation 1

$5.45$ (eV)$\leq Ip$ (the surface of the photoconductor) $\leq 5.53$ (eV)     Relation 2 where Ip (the surface of the photoconductor) represents the ionization potential of the surface of the photoconductor and Ip (the surface of the toner) represents the ionization potential of the surface of the toner, wherein when the surface of the photoconductor is irradiated with homogeneous light in an ultraviolet range and a graph of a cubic root of all electron yield of emitted photoelectrons as a function of an incident light energy is created, the photoconductor has a gradient of a base line as an approximate straight line on a side of a low energy of 0 or less of approximate straight lines of the cubic root of all the electron yield to the incident light energy in a vicinity of a threshold identified as the ionization potential of curves on a side of the lowest incident light energy about an obtained spectrum, and wherein a surface layer overlies the charge transport layer, the surface layer comprising a cross-linking resin.

2. The image forming method according to claim 1, wherein the photosensitive layer is formed of two or more layers and a difference of ionization potentials between adjacent layers is 0.30 eV or less.

3. The image forming method according to claim 1, wherein a difference of ionization potentials between the charge generating layer and the charge transport layer is 0.05 eV or less.

4. The image forming method according to claim 1, wherein the intermediate layer includes zinc oxide.

5. An image forming apparatus using the image forming method of claim 1.

6. A process cartridge utilizing the image forming method of claim 1.

7. An image forming method comprising:

forming an image with a toner using a photoconductor in which an intermediate layer and a photosensitive layer including a charge generating layer and a charge transport layer are formed overlying an electroconductive substrate, wherein the toner comprises a releasing agent having a melting point of from 50 to 120 degrees C., wherein an ionization potential of a surface of the photoconductor and an ionization potential of a surface of the toner satisfy the following relations 1 and 2, $|Ip$ (the surface of the photoconductor)$-Ip$ (the surface of the toner)$|\leq 0.18$ (eV)     Relation 1

$5.45$ (eV)$\leq Ip$ (the surface of the photoconductor)$\leq 5.53$ (eV)     Relation 2 where Ip (the surface of the photoconductor) represents the ionization potential of the surface of the photoconductor and Ip (the surface of the toner) represents the ionization potential of the surface of the toner, wherein the toner has a BET specific surface area of from 0.5 to 4.0 m$^2$/g, wherein when the surface of the photoconductor is irradiated with homogeneous light in an ultraviolet range and a graph of a cubic root of all electron yield of emitted photoelectrons as a function of an incident light energy is created the photoconductor has a gradient of a base line as an approximate straight line on a side of a low energy of 0 or less of approximate straight lines of the cubic root of all the electron yield to the incident light energy in a vicinity of a threshold identified as the ionization potential of curves on a side of the lowest incident light energy about an obtained spectrum, and wherein a surface layer overlies the charge transport layer, the surface layer comprising a cross-linking resin.

8. The image forming method according to claim 7, wherein a common logarithm value Log ρ of the toner has a volume resistivity of ρ (Ω·cm) of from 10.9 to 11.4 Log Ω·cm.

* * * * *